United States Patent
Blott et al.

(10) Patent No.: US 6,681,230 B1
(45) Date of Patent: Jan. 20, 2004

(54) REAL-TIME EVENT PROCESSING SYSTEM WITH SERVICE AUTHORING ENVIRONMENT

(75) Inventors: Stephen M. Blott, Gillette, NJ (US); Yuri Breitbart, Scotch Plains, NJ (US); Thomas M. Cliff, Jr., Granville, OH (US); Frank Frastaci, Jr., Westerville, OH (US); Henry F. Korth, Lower Gwynedd, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/276,218

(22) Filed: Mar. 25, 1999

(51) Int. Cl.[7] .............................................. G06F 17/00
(52) U.S. Cl. ................ 707/104.1; 707/100; 379/265.01
(58) Field of Search ............................. 707/100–104.1, 707/1–10; 379/201.01–201.02, 265.01–265.09; 717/106, 140

(56) References Cited

U.S. PATENT DOCUMENTS

| | | | | |
|---|---|---|---|---|
| 5,546,455 A | * | 8/1996 | Joyce et al. ................. | 379/265 |
| 5,740,423 A | * | 4/1998 | Logan et al. ................ | 395/610 |
| 5,751,798 A | | 5/1998 | Mumick et al. | |
| 5,828,845 A | * | 10/1998 | Jagadish et al. ............ | 395/200 |

FOREIGN PATENT DOCUMENTS

| | | | |
|---|---|---|---|
| GB | 0809387 A2 | * 11/1997 | |
| GB | 0809410 A2 | * 11/1997 | ........................ 3/66 |

OTHER PUBLICATIONS

Marwedel (Code generation for core processors, ACM, 1997, pp. 1–6).*

Saksena et al. (Guidelines for automated implementation of executable object oriented models for real–time embedded control systems, IEEE, 1997, pp. 240–251).*

Baulier et al., Sunrise: A Real–Time Event–Processing System, Bell Labs Technical Journal, Jan.–Mar. 1998, pp. 3–18.*

Cha et al. Object–Oriented Design of Main–Memory DBMS for Real–Time Application, IEEE, 1995, pp. 109–115.*

Fletcher et al., U.S. Statutory Invention Registration, H1,894, Oct. 2000.*

(List continued on next page.)

*Primary Examiner*—Kim Vu
*Assistant Examiner*—Joon Hwan Hwang

(57) ABSTRACT

A real-time event processing system (EPS) for processing a sequence of events generated by one or more applications. In an illustrative embodiment, the EPS includes a set of real-time analysis engines (RAEs) operating in parallel, e.g., a set of clusters each including one or more RAEs, and one or more mappers for mapping a given input event to a particular one of the clusters. A main-memory database system is coupled to the RAEs, and the RAEs process events associated with input streams from one or more data sources and deliver output streams to one or more data sinks. The data source and data sinks may be, e.g., network elements, clients, databases, etc. The events are processed in accordance with services implemented in the RAEs, and utilize data stored in a memory portion of the main-memory database system accessible to the RAEs. The data may include, e.g., a subscription table storing subscription information indicating the service or services that should be executed for a given event. The services are generated in a service authoring environment (SAE) in the EPS, using a declarative language. The SAE generates the services in the form of object code components, e.g., dynamically linked libraries, which may be dynamically linked into the RAEs without interrupting event processing. Recovery information regarding a recovery point for a given RAE or set of RAEs in the EPS may be stored in a memory portion of the main-memory database system, and utilized to implement a roll-back of the RAE to the recovery point.

21 Claims, 13 Drawing Sheets

OTHER PUBLICATIONS

Jagadish et al., View Maintenance Issues for the Chronicle Data Model, ACM, May 1995, pp. 113–124.*

G.D. Baulier et al., "Sunrise: A Real–Time Event–Processing System," Bell Labs Technical Journal, pp. 3–18, Jan.–Mar., 1998.

J. Baulier et al., "A Database System for Real–Time Event Aggregation in Telecommunication," Proceedings of the 24th VLDB Conference, New York, USA, 3 pages, 1998.

H.V. Jagadish et al., "View Maintenance Issues for the Chronicle Data Model," Proc. ACM SIGACT–SIGMOD–SIGART Symp. on Principles of Database Systems (PODS), San Jose, Calif., pp. 113–124, May 1995.

N.H. Gehani et al., "Event Specification in an Active Object–Oriented Database," AT&T Bell Labs Technical Journal, pp. 81–90, 1992.

X. Qian et al., "Incremental Recomputation of Active Relational Expressions," IEEE Transactions on Knowledge and Date Engineering, vol. 3, No. 3, pp. 337–341, Sep. 1991.

P.L. Bohannon et al., "The Architecture of the Dali Main Memory Storage Manager," Bell Labs Tech. J., vol. 2, No. 1, pp. 1–36, 1997.

H.V. Jagadish et al., "Dali: A High Performance Main Memory Storage Manager," Proc. Intl. Conf. on Very Large Databases (VLDB), Santiago, Chile, pp. 1–12, Sep. 1994.

D. DeWitt et al., "Implementation Techniques for Main–Memory Database Systems," Proc. ACM SIGMOD Intl. Conf. on Management of Data, Boston, Mass., pp. 1–8, Jun. 1984.

T.J. Lehman and M.J. Carey, "A Study of Index Structures for Main–Memory Database Management Systems," Proc. Intl. Conf. on Very Large Databases (VLDB), Kyoto, Japan, Aug. pp. 294–303, 1986.

T.J. Lehman et al., "An Evaluation of Starburst's Memory–Resident Storage Component," IEEE Transactions on Knowledge and Data Engineering, vol. 4, No. 6, pp. 555–566, Dec. 1992.

K. Salem et al., "System M: A Transaction Processing Testbed for Memory Resident Data," IEEE Transactions on Knowledge and Data Engineering, vol. 2, No. 1, pp. 161–172, Mar. 1990.

* cited by examiner

FIG. 5A

```
declare
    concrete record type
    custBalanceType {
        idType          custId;
        moneyType       balance;
        durationType    totalMinutes;
    };
create
    base table      custBalance
    of custBalanceType;
```

FIG. 5B

```
declare
    concrete record type
    CDRNormalType {
        idType              custId;
        phoneNumType        destNumber;
        timesStampType      callTStamp;
        durationType        duration;
        moneyType           rate;
        moneyType           charge;
    };
create
    chronicle CDROutput
    of CDRNormalType;
```

FIG. 5C

```
declare
    concrete record type
    custChargeType {
        idType          custID;
        moneyType       balance;
    };
create
    view totalCustCharge
    as select
        custID,
        SUM (charge) as balance
    from CDROutput
    group by custId;
```

FIG. 6

```
create service steppedPrice {
  declare
    concrete record type rateTableType {
      durationType lowVol;
      durationType highVol;
      rateType     rate;
    };

declare base table rateTable
    of rateTableType;

handle callSetup {
    .
    .
    .
  };
```

```
  handle callCompletion {
    durationType useg;
    rateType     rate;
    set useg = pick from
                 select totalMinutes
                 from   custBalance
                 where  custId = cdr.custId;
    set rate = pick from
                 select rate
                 from   rateTable
                 where  lowVol < useg
                        and useg <= highVol;
    set cdr.charge = cdr.charge +
                     rate * cdr.duration;
    set cdr.rate   = cdr.rate * rate;
  };
};
```

FIG. 8B

| subscriberId | startTimeStamp | endTimeStamp | subscription |
|---|---|---|---|
| Frank | 1/1/97 | 3/31/97 | - a - |
| Frank | 4/1/97 | 12/31/97 | - b - |
| Steve | 6/30/97 | 6/30/98 | - c - |
| preprocessingSub | 1/1/97 | 12/31/98 | - d - |
| postProcessingSub | 1/1/97 | 12/31/98 | - e - |

FIG. 9

SL ::= NOTHING

| serviceId

| $SL_1$; $SL_2$

| DELEGATE subscriberId

| IF serviceId $SL_1$ [ ELSE $SL_2$ ]

| serviceId* EXCLUDE SL

| serviceId* PREREQUISITE SL

| FIRST eventName+ SL*

| MAXIMUM eventName expression SL*

| MIMIMUM eventName expression SL*

FIG. 10A

```
declare concrete record type           declare
   exampleCDRType1 {                      concrete record type CDRNormalType {
      intType         format;                idType             custId;
      idType          custId;                phoneNumberType    destinationNumber;
      phoneNumberType destinationNumber;     timestampType      callTimestamp;
      durationType    duration;              durationType       duration;
      dateType        calldate;              dollarCentType     rate;
      timeType        callTime;              dollarCentType     charge;
      idType          sensor;            };
} with key format == 0x0001;
                                        create normalization of exampleCDRType1
declare concrete record type               as CDRNormalType with {
   exampleCDRType2 {                          callTimestamp    = mkTS (callDate,callTime);
      intType         format;            };
      idType          custId;
      dateType        callDate;          create normalization of exampleCDRType2
      timeType        callTime;             as CDRNormalType {
      intType         hours;                 duration         = minutes + 60 * hours
      intType         minutes;               callTimestamp    = mkTS (callDate,callTime);
      phoneNumberType destinationNumber; };
} with key format == 0x0002;
```

FIG. 10B

```
declare concrete record type
   CDRNormalBaseType {
      dollarCentType rate;
      dollarCentType charge;
};

declare abstract record type CDRNormalType
   under CDRNormalBaseType {
      idType custId;
      phoneNumberType destinationNumber;
      timeStampType callTimestamp;
      durationType duration;
};
```

REAL-TIME EVENT PROCESSING SYSTEM WITH SERVICE AUTHORING ENVIRONMENT

RELATED APPLICATIONS

The present application is related to U.S. patent application Ser. No. 09/276,339 entitled "Real-Time Event Processing System for Telecommunications and Other Applications," U.S. patent application Ser. No. 09/276,340 entitled "Real-Time Event Processing System with Subscription Model," and U.S. patent application Ser. No. 09/276,221 entitled "Real-Time Event Processing System with Recovery Model," all filed concurrently herewith.

FIELD OF THE INVENTION

The present invention relates generally to real-time event processing, and more particularly to methods, apparatus and systems for processing real-time events in applications such as telecommunications and computer networks.

BACKGROUND OF THE INVENTION

Many event-processing systems have real-time performance requirements that cannot be met by conventional general-purpose database management systems. In telecommunications applications, for example, a variety of adjunct switching services such as debit-based billing, number mapping, call forwarding, and local-number portability involve event processing during the critical call-connection phase of a telephone call. To meet the real-time requirements of the network, the service time for such events generally must not exceed a few milliseconds. However, with conventional database technology, the costs of invoking a structured query language (SQL) operation over a client-server interface, or the costs associated with a single access to secondary storage, can account for hundreds of milliseconds. As a consequence, performance goals on the order of a few milliseconds may already be unattainable even before the costs of the event processing logic are taken into account.

These limitations have led to the use of custom database systems for many high-performance real-time event processing applications. Custom systems are typically tightly coupled to their particular applications, and are tuned to the specific requirements of those applications. These solutions generally work well in practice, and can provide close to optimal performance. However, they also have a number of serious disadvantages. For example, the cost of developing and maintaining custom systems can be high, and generally cannot be amortized across a number of different applications. Moreover, custom systems are frequently inflexible. It can become difficult or even impossible to adapt a custom system to unforeseen or evolving requirements.

A need therefore exists for an improved real-time event processing system which provides the performance benefits of custom database systems, without sacrificing the flexibility and maintainability typically associated with conventional general-purpose database systems.

SUMMARY OF THE INVENTION

The invention provides a general-purpose real-time event processing system (EPS) which avoids the problems associated with custom systems. The EPS in an illustrative embodiment meets real-time performance goals through the use of one or more real-time analysis engines (RAEs) operating in conjunction with a main-memory storage manager as its underlying database system. The main-memory storage manager offers transactional access to persistent data, but at the speed of a main-memory system. Application-specific services for execution in the RAEs of the EPS are generated in a service authoring environment (SAE). The SAE provides a set of tools and one or more graphical user interfaces (GUIs) for authoring, validating, compiling and installing new services, or adapting existing services to new requirements.

In accordance with the invention, the SAE which is used to generate services executed in the RAEs may include a declarative language comprising one or more of the following data structures: (i) a base table which supports insert, update, delete and select operators, (ii) a chronicle which supports insert and select operators, wherein an insert into a chronicle corresponds to generation of a record on an output stream, and (iii) a view which supports a select operator and whose contents are derived from one or more other tables. Both the base tables and the views may be stored explicitly in a memory portion of the main-memory database system accessible to the RAEs, but chronicles are generally not stored in the memory portion of the main-memory database system. The SAE further includes a GUI for generating the services, a static check element for processing a given service generated by the GUI, and a translation and compilation element for generating program code for implementing the given service within the RAEs. The SAE may generate at least one of the services in the form of object code which is dynamically linked into the RAEs without interrupting event processing.

A real-time EPS in accordance with the invention provides a critical path for event processing that is specifically designed for high performance, while also retaining many desirable features of conventional database systems, including high-level, declarative programming interfaces, and the well-known transactional correctness properties of atomicity, consistency, isolation and durability (ACID). These features of the invention enhance the reliability, robustness, usability and maintainability of the real-time EPS and the applications built thereon.

The invention can be used in conjunction with any event processing application, including, for example, telecommunications, electronic commerce, and Internet service provisioning applications. For example, in a telecommunications application, the invention can be configured to provide a basis for features such as enhanced billing systems, fraud detection and prevention, local-number portability, settlements among service providers and real-time traffic analysis.

BRIEF DESCRIPTION OF THE DRAWINGS

FIGS. 5A, 5B and 5C show table-definition examples for use in the SAE of FIG. 4.

FIG. 6 shows an example of a service that may be implemented using the SAE of FIG. 4.

FIG. 8B shows an example of a compact subscription table suitable for use in a real-time event processing system.

FIG. 9 shows the syntax of an illustrative subscription language.

FIGS. 10A and 10B illustrate input stream authoring a simplified call detail record (CDR) stream with two different record formats.

DETAILED DESCRIPTION OF THE INVENTION

Figure 1:
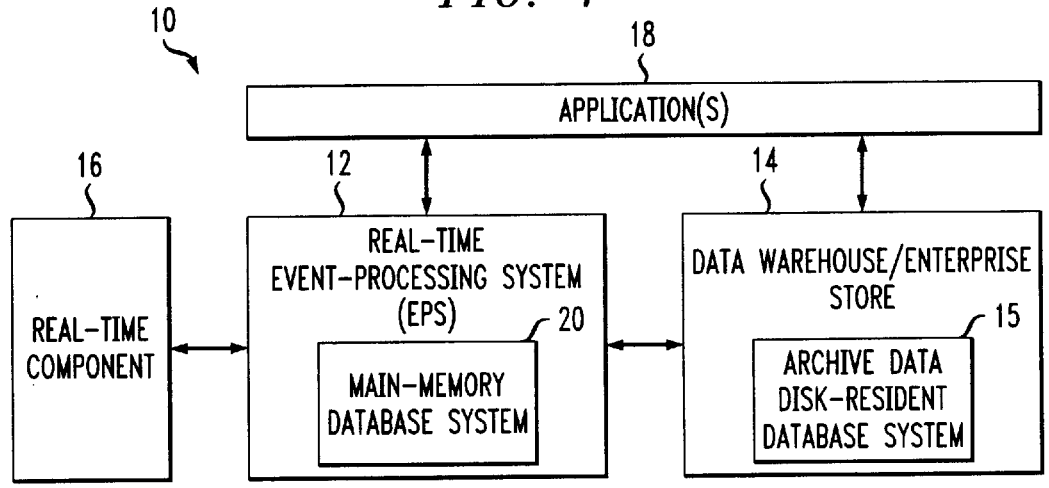
FIG. 1 shows an illustrative embodiment of the invention including a real-time event processing system.

FIG. 1 shows an illustrative embodiment of an information processing system 10 in accordance with the invention. The system 10 includes a real-time event processing system (EPS) 12, a data warehouse/enterprise store (DW/ES) 14 including archive data and disk-resident database system 15, a real-time component 16, and one or more applications 18, e.g., billing, fraud detection/prevention, etc. The real-time EPS 12 includes a main-memory database system 20, which may be, e.g., a DataBlitz™ system to be described in more detail below. The real-time EPS 12 processes events on behalf of the real-time component 16, which may be, e.g., a network switch, a service control point (SCP) or other element of a communication system or network, and maintains summary and aggregation data over those events.

In order to meet real-time performance goals, the data necessary for event processing is stored in the main-memory database system 20 of EPS 12. Due to space limitations in the main-memory database system 20, individual processed-event records are typically sent to the DW/ES 14 for archiving. Archived data may be used later for non-real-time tasks, such as auditing, data mining, and reprocessing (e.g., if all processing cannot be performed when the event occurs). The DW/ES 14 may be, e.g., a commercially available relational database management system (DBMS), and may comprise either a data warehouse, an enterprise store, or both, as well as other arrangements of conventional data storage elements. The term "event" as used herein is intended to include any type of transaction involving contents of a database system, such as, for example, a group of read, update, delete and/or modify operations.

The real-time EPS 12 in the illustrative embodiment requires space complexity to be bounded over any sequence of events, regardless of the number of events in the sequence. Although this assumption limits the class of processing that can be supported in the illustrative embodiment, other embodiments need not be subject to this assumption, i.e., the assumption is not a requirement of the invention. It should be noted that certain existing telecommunication pricing plans cannot be wholly realized within the illustrative embodiment of EPS 12 because they have unbounded space complexity. For example, a pricing plan that awards a discount for the phone number a customer calls the most in a particular billing cycle has unbounded space complexity, because determining which number is called the most requires maintaining statistical information that grows with each new number called.

In general, the EPS 12 in the illustrative embodiment stores configuration data, summary data and aggregation data. Configuration data is read-only data that supports event processing, and may include, e.g., rating tables, customer information or routing information. Summary data provides condensed information about processed events, such as histograms, or counts of events satisfying some property. Aggregation data combines information such as counts, averages, minimums, maximums and totals over all processed events. Typically, summary data and aggregation data are updated as events are processed, but configuration data is not.

The real-time component 16 may be coupled to the EPS 12 via a local area network, a metropolitan area network, a wide area network, a global data communications network such as the Internet, a private "intranet" or "extranet" network or any other suitable data communication medium. As noted previously, the real-time component 16 may be a switch or other element of such a network. Other examples of real-time components which may interact with the EPS 12 include automatic teller machines or desktop personal computers, portable computers, personal digital assistants (PDAS) or other mobile computing devices, or any other type of digital data processors. The EPS 12 itself may be implemented in whole or in part using a computer or other type of digital data processor. For example, the EPS 12 may be implemented as one or more personal, micro or mainframe computers, workstations, microprocessors, central processing units (CPUs), application-specific integrated circuits (ASICs) or other digital data processors, as well as various portions or combinations thereof. The EPS 12 may utilize electronic, magnetic or optical storage media, or various combinations thereof.

Figure 2:
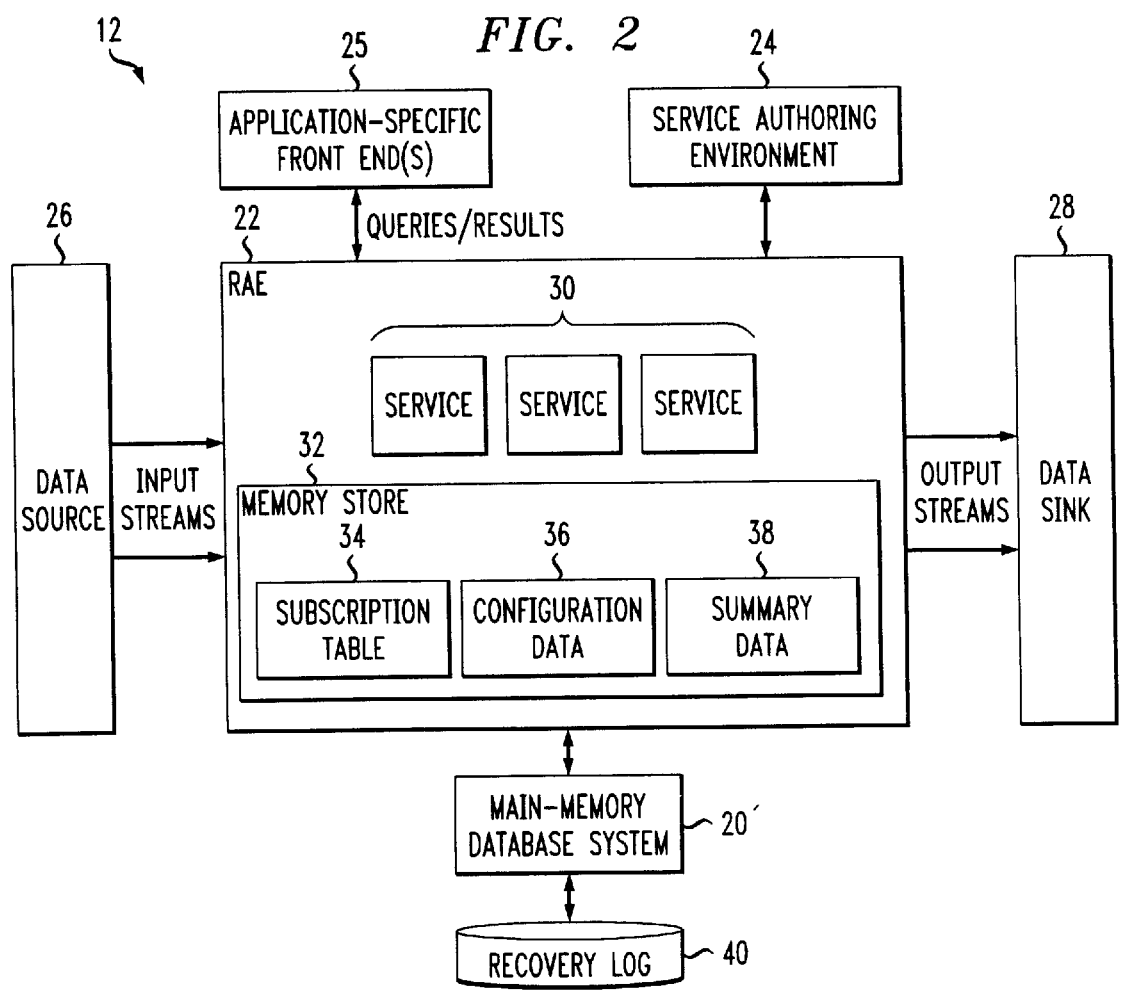
FIG. 2 shows a more detailed view of the real-time event processing system of FIG. 1.

FIG. 2 shows a more detailed view of the real-time EPS 12 of FIG. 1. The EPS 12 in this embodiment includes a real-time analysis engine (RAE) 22 and a service authoring environment (SAE) 24. Each of these elements will be described in detail below.

Real-Time Analysis Engine (RAE)

The RAE 22 in the illustrative embodiment is a single-site database system kernel adapted to meet the needs of high-throughput, real-time systems, and serves as the real-time event processing and aggregation engine of the EPS 12. High throughput may be achieved by allowing several RAEs to run in parallel, as will be illustrated in conjunction with FIG. 3. Real-time responsiveness is achieved by storing configuration, summary and aggregation data in a main-memory store, which provides transactional access to persistent data at main-memory speeds.

The RAE 22 interacts with one or more application-specific front ends 25 associated with the applications 18 of FIG. 1, receives input streams from a data source 26, and delivers output streams to a data sink 28. The data source may represent, e.g, a switch, SCP or other network element of the real-time component 16, a client associated with application(s) 18, or the DW/ES 14. The RAE 22 processes using a set of application-specific services 30, which are authored using the SAE 24. The RAE 22 includes a memory store 32 which stores a subscription table 34, as well as the above-described configuration data 36 and summary data 38. The set of services invoked for event processing in this embodiment is subscription based, and makes use of the subscription table 34 and a subscription model, which will be described in greater detail below. The side effects of event processing are updates to the aggregation and summary data. Outputs of the RAE 22 are delivered to the data sink 28, which may represent, e.g, a switch, SCP or other network element of the real-time component 16, a client associated with application(s) 18, or DW/ES 14. Other examples of data sources or data sinks include the examples of the real-time component 16 and EPS 12 given previously, e.g., computers or other types of digital data processors.

Memory Store

The memory store 32 in RAE 22 of FIG. 2 will now be described in greater detail. In this embodiment, the memory store 32 is shown as within the RAE, and is part of the main-memory database system 20 of FIG. 1. The other portions of the main-memory database system 20 of FIG. 1 are designated as main-memory database system 20' in FIG. 2. The memory store 32 is persistent, and offers all the atomicity, consistency isolation and durability (ACID) guarantees of a conventional database system. It is used to store the configuration, summary and aggregation data which supports event processing. As such, the performance of the memory store is critical to the performance of RAE as a whole.

In order to meet real-time performance requirements, the memory store 32 may be based on a single-site, main-memory storage manager offering transactional access to persistent data at main-memory speeds, such as the above-noted DataBlitz™ main-memory database system. Certain aspects of main-memory database systems are described in greater detail in, e.g., P. L. Bohannon et al., "The Architecture of the Dalí Main Memory Storage Manager," Bell Labs Tech. J., Vol. 2, No. 1, pp. 36–47, Winter 1997, and H. V. Jagadish et al., "Dalí: A high performance main memory storage manager," Proc. Intl. Conf. on Very Large Databases (VLDB), Santiago, Chile, September 1994, pp. 48–59, both of which are incorporated by reference herein. Additional details regarding the DataBlitz™ system may be found in "DataBlitz™ Storage Manager Administration and Operations Guide," Issue 1.1, Lucent Technologies Inc., January 1998, which is incorporated by reference herein.

In conventional disk-resident database systems, only a small part of a database is buffered in memory at any point in time. The rest is accessed on secondary storage when and if it is required. A single disk access can account for from tens to hundreds of milliseconds, making real-time performance very difficult to achieve. The DataBlitz™ system, on the other hand, has been designed under the assumption that the entire database resides in main memory. This assumption is becoming attractive for many applications as memory prices fall and machines with gigabytes of main memory become increasingly affordable. Moreover, the data structures, algorithms and architecture of DataBlitz™ system are designed under the assumption of main-memory residency, which provides additional performance improvements.

The DataBlitz™ system also incorporates several special features for on-line event processing. For example, a technique known as "ping-pong checkpointing" allows a consistent database state to be recorded in non-volatile storage without interrupting regular event processing. The DataBlitz™ system supports so-called "hot spares," which provide availability, even in the presence of single-site failures. A hot spare is run in parallel to and up-to-date with a primary site. Should the primary site fail, the spare is available to take over its workload more-or-less immediately. Although this helps to shield applications from many of the effects of single-site failures, such failures may nonetheless have real-time implications and an impact at the application level.

Additional details regarding main-memory database systems suitable for use with the EPS 12 of FIG. 1 can be found in. e.g., D. DeWitt et al., "Implementation techniques for main-memory database systems," Proc. ACM SIGMOD Intl. Conf. on Management of Data, Boston, Mass., pp. 1–8, June 1984, T. J. Lehman and M. J. Carey, "A study of index structures for main-memory database management systems," Proc. Intl. Conf. on Very Large Databases (VLDB), Kyoto, Japan, August 1986, pp. 294–303, and T. J. Lehman et al., "An evaluation of Starburst's memory-resident storage component," IEEE Transactions on Knowledge and Data Engineering, Vol. 4, No. 6, pp. 555–566, December 1992, all of which are incorporated by reference herein.

Embedded Services

In client-server databases, part of an event's work is performed at the database client, and part at the database server. Although satisfactory for many applications, this partitioning of a task into two parts introduces considerable overhead. For example, invoking a database operation is a costly procedure. Even if the client and server are on the same system, there are still overhead costs associated with marshaling arguments and results across the server interface and with context switching between the two processes. For ad hoc queries, the server must also parse the query, generate execution plans, and select the best execution plan, all before the query itself is actually executed. With a secondary-memory database, these overheads are usually considered acceptable since performance is normally dominated by input/output (I/O) costs. In the illustrative embodiment of EPS 12, however, in which database operations are processed at main-memory speeds, these overheads generally should not be neglected.

The EPS 12 in the illustrative embodiment is unlike a conventional client-server system in that, e.g., application-specific services and the RAE execute within the same process address space. Moreover, the EPS 12 does not admit ad hoc queries, so all the costs of selecting a query plan are incurred once, statically. This embedded approach reduces costs by eliminating communication costs and shortening path lengths. If an event first accesses data in the memory store, then performs some application-specific processing, and finally performs an update again within the memory store, then it does so wholly within the context of a single process or thread.

Although embedding services in this way improves performance, it also introduces a number of potential problems, one of which is safety. If service code were to raise any kind of unforeseeable error condition, such as a memory leak, a segmentation violation, or an infinite loop, then the integrity of the RAE itself could be compromised. In its mildest form, this might lead to resource leakage. More important is the possibility that the RAE might crash and become unavailable for a period of time, or that the memory store might even become inconsistent (due to, e.g., corrupted or lost data, or incorrect events). The EPS 12 addresses these potential safety concerns through the use of the SAE. The SAE provides high-level, declarative programming tools that can validate event handlers statically, and compile services in a way that either avoids or handles the error conditions noted above. This mitigates many of the safety risks associated with embedding application-specific code within the RAE itself.

Another potential problem concerns availability. A conventional static approach to linking would require RAE to be taken off-line briefly for re-linking whenever new services are installed. Taking RAE off-line in this way could interrupt regular event processing. This potential difficulty can be overcome by, for example, compiling services defined within the service-creation platform to object code, and then dynamically linking object-code modules into the RAE, without interrupting event processing. This approach supports availability, even as processing requirements evolve over time.

Distribution and Parallelism

The two key resources governing the performance of the RAE 22 are main memory and central processing unit (CPU) cycles. Both of these can, if over-stretched, become a bottleneck. The available memory limits the number of customers whose summary and aggregation data can be placed in the memory store. The available CPU resources bound the throughput of the RAE. Moreover, if queues are allowed to develop under heavy workloads, then responsiveness can also be degraded. However, even if the CPU is not a problem, the available memory can also become a bottleneck. Frequently, some entity (such as a customer) accounts for both memory and CPU usage. If memory resources are limited such that no new entities (customers) can be assigned to the RAE, then utilization of the CPU can be low. Thus, a balance must be struck between the CPU and the memory resources of a system. In the case that a single RAE has insufficient resources for a particular workload, the EPS 12 of FIG. 2 can be configured such that multiple RAEs work in parallel.

Figure 3:
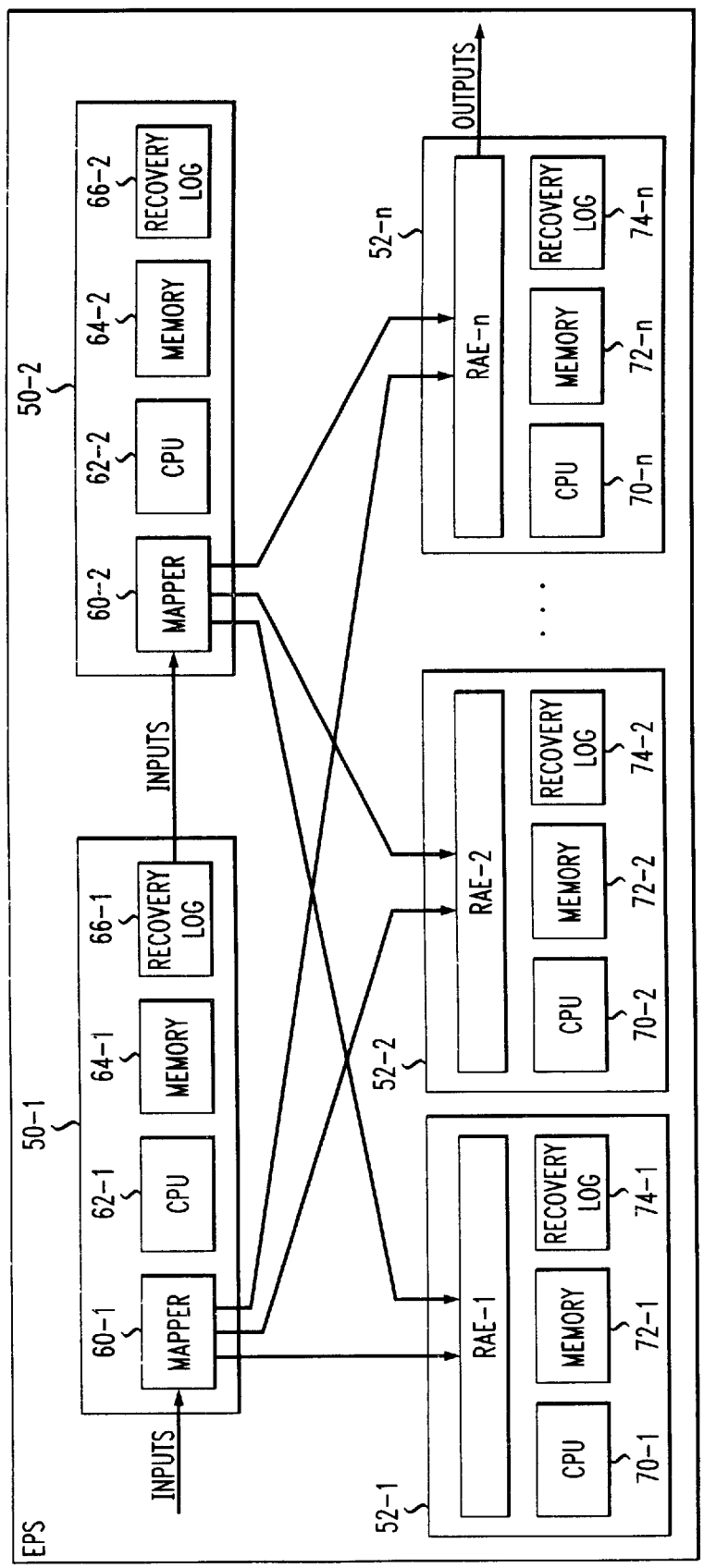
FIG. 3 illustrates parallel processing which may be implemented in the real-time event processing system of FIG. 1.

FIG. 3 illustrates an embodiment of the EPS 12 which includes n RAEs operating in parallel, using a "shared-nothing" approach. The RAEs are designated RAE-1, RAE-2, . . . RAE-n. The EPS 12 includes two mapping units 50-1 and 50-2, each of which includes a mapper 60-i, a CPU 62-i, a memory 64-i, and a recovery log 66-i, i=1, 2. The EPS 12 also includes n RAE sites 52-j, j=1, 2, . . . n, each of which includes a RAE designated RAE-j, a CPU 70-j, a memory 72-j, and a recovery log 74-j. Each memory-store table is either replicated across all of the n RAE sites, or partitioned across all sites. Generally, replication is used for configuration data such as rate tables, whereas partitioning is used for summary and aggregation data. This shared-nothing approach to parallelism harnesses the aggregated memory and CPU resources of several systems. Shared-nothing parallelism is well-suited to real-time, "rifle-shot" event processing, and throughput scale-up can be close to linear. As such, doubling the number of processors can double the throughput while still maintaining the same average response time.

The mappers 60-i assign events to the RAE site 52-j on which they are processed, as illustrated in FIG. 3. A given mapper maintains a mapping table, which may be implemented as a hash table. When the data for an event arrives on an input stream, it may be assumed that a so-called "subscriber" can be identified for the event. Defining the subscriber for different classes of events is an authoring issue which is addressed by the SAE, as will be described below. One of two rules is then used for mapping an event to an individual RAE site for processing. If there is an entry in the mapping table for the event's subscriber, then that entry identifies the RAE to which the event is assigned. If there is no entry in the mapping table, then a default hash function is used to select the RAE to which the event is assigned. The use of an explicit mapping table has the advantage that subscribers can be re-located if there is a load imbalance between RAEs, or if one subscriber must be co-located with another, e.g., to support customer hierarchies. However, the memory overhead of maintaining an explicit mapping can be avoided for cases in which the default hash-function mapping suffices. For events whose processing spans several RAEs, distribution may be managed automatically by the EPS 12 in a manner which is transparent to applications.

A potential difficulty with the parallel RAE architecture as shown in FIG. 3 is that a single mapper can represent a single point of failure on which the whole system depends. In addition, as the workload increases, the mapper itself can become a bottleneck. One possible alternative architecture allows several nodes to work together to implement the mapping function, and achieves high availability by allowing one mapper to take over the workload of another in the event of failure. Moreover, distribution and parallelization are transparent to the authors of services. Generally, most events are serviced by a single RAE. Nevertheless, it may be necessary for some events to be serviced by several RAEs. This situation arises, for example, whenever an event accesses data which has been partitioned across several sites. However, such distributed event processing can be handled automatically by the EPS 12. This is made possible by the largely-declarative nature of the authoring process at the SAL level, as will be described below.

Service Authoring Environment (SAE)

The SAE 24 is a tool for authoring the application-specific services, and embedding those services within the RAE 22. These services define: (1) the event-processing logic of a system; (2) the configuration, summary and aggregation information which is maintained to support event processing; (3) canned queries that can be invoked within a system; and (4) the input and output streams which interface the EPS 12 to existing data sources or sinks. Authoring is a high-level procedure based on a set of graphical user interfaces (GUIs) and a service authoring language (SAL). The services authored using the SAE 24 allow the EPS 12 to be applicable in a wide range of areas, including, e.g., billing systems, intelligent networks, Internet services, and network management. Possible specific applications in the telecommunications area include debit-based billing, fraud detection and prevention, call centers, hot billing, and adjunct switching services such as local-number portability and toll-free number mapping.

An example of a service which may be implemented in the EPS 12 is a debit-based billing system for telephone calls, where each customer has a pre-deposited balance. A callConnection event occurs whenever a call is placed. The goal of processing callConnection events is to establish a pre-approved duration for a call based on the customer's current balance. If sufficient funds are available, then a maximum pre-approved duration is determined. If insufficient funds are available, then a pre-approved duration of zero is assigned, and the call is effectively blocked. Upon call completion, a callCompletion event occurs, at which point the actual charges for a call are calculated, and debited from the customer's balance.

This type of debit-based billing system is closely coupled to the provisioning information and switching elements within a network, and must be highly available. Since callConnection events are processed during the critical connection phase of a telephone call, they must meet the real-time performance requirements of the network. These typically dictate that the response time for event processing must be on the order of only a few milliseconds.

The need for high throughput is also clear. Many network elements handle peak rates of many hundreds of calls placed every second. However, performance is not the only issue raised by this example. From a functionality perspective, computing the charges for a call is non-trivial, and generally depends upon the set of discount plans subscribed to by a customer. In practice, the specific plans offered by carriers are subject to frequent change, and individual customers subscribe to not one, but several plans. For example, different charges may apply to local, long-distance and international calls. Moreover, the charge may depend upon the day, the time of day, the length of the call, and/or the volume or value of calls generated by the customer at hand. Almost all calls are also subject to taxation. Some plans, such as those based on a customer's volume or value, depend on aggregation data, which must be maintained as events are processed. Over time, both the algorithms for computing charges, and the configuration, summary and aggregation data on which those algorithms are based, such as rate tables and customer summaries, evolve. As such, a debit-based billing system must offer both performance and flexibility.

Another example of a service which may be implemented in the EPS 12 is a fraud detection and prevention system. Such a system may maintain, for each customer, summary information in the form of a "fraud signature" that describes the regular calling pattern for that customer. For example, one customer may make frequent international calls, while another seldom places calls outside their state, or even their local exchange. Similarly, one customer may generally place calls on weekday mornings, while another is more active on the weekend. Fraud signatures describing these usage patterns are stored for each customer. The signatures are then used to detect irregular patterns, with similarity to known fraudulent patterns, when and if these occur.

This type of system requires a processing model similar to that of the debit-based billing system of the previous example, but the summary information and event-processing algorithms may be very different. In particular, fraud signatures are highly dependent upon the class of fraud being targeted. International fraud may require signatures describing patterns in call destinations, whereas patterns in call sources may be more relevant for mobile fraud. As such, the algorithms for maintaining and comparing fraud signatures are non-trivial. Moreover, fraud patterns themselves change over time, and fraud signatures and their associated algorithms must evolve to reflect those changes.

As noted above, the SAE 24 makes use of a largely-declarative language referred to herein as service authoring language (SAL). Data management features of SAL in the illustrative embodiment are derived from the structured query language (SQL), a de facto industry standard language for manipulating persistent, tabular data, supported by nearly all commercial relational database systems. SQL is described in, e.g., A. Silberschatz, H. F. Korth and S. Sudarshan, "Database System Concepts," Third Edition, McGraw-Hill, New York, 1997, which is incorporated by reference herein. While a general-purpose language, such as C++, Perl, or Java, may also be used to implement service creation, there are a number of practical advantages to using a richer but more restrictive, declarative approach. With respect to performance, declarative languages are generally more amenable to automatic optimization, parallelization, and complexity analysis. For example, if several RAEs are run in parallel as shown in FIG. 3, then the processing of a single event may span several RAE sites. The declarative approach allows such issues of distribution to be transparent to authors. Other advantages include simplicity, and safety of authored services.

Figure 4:
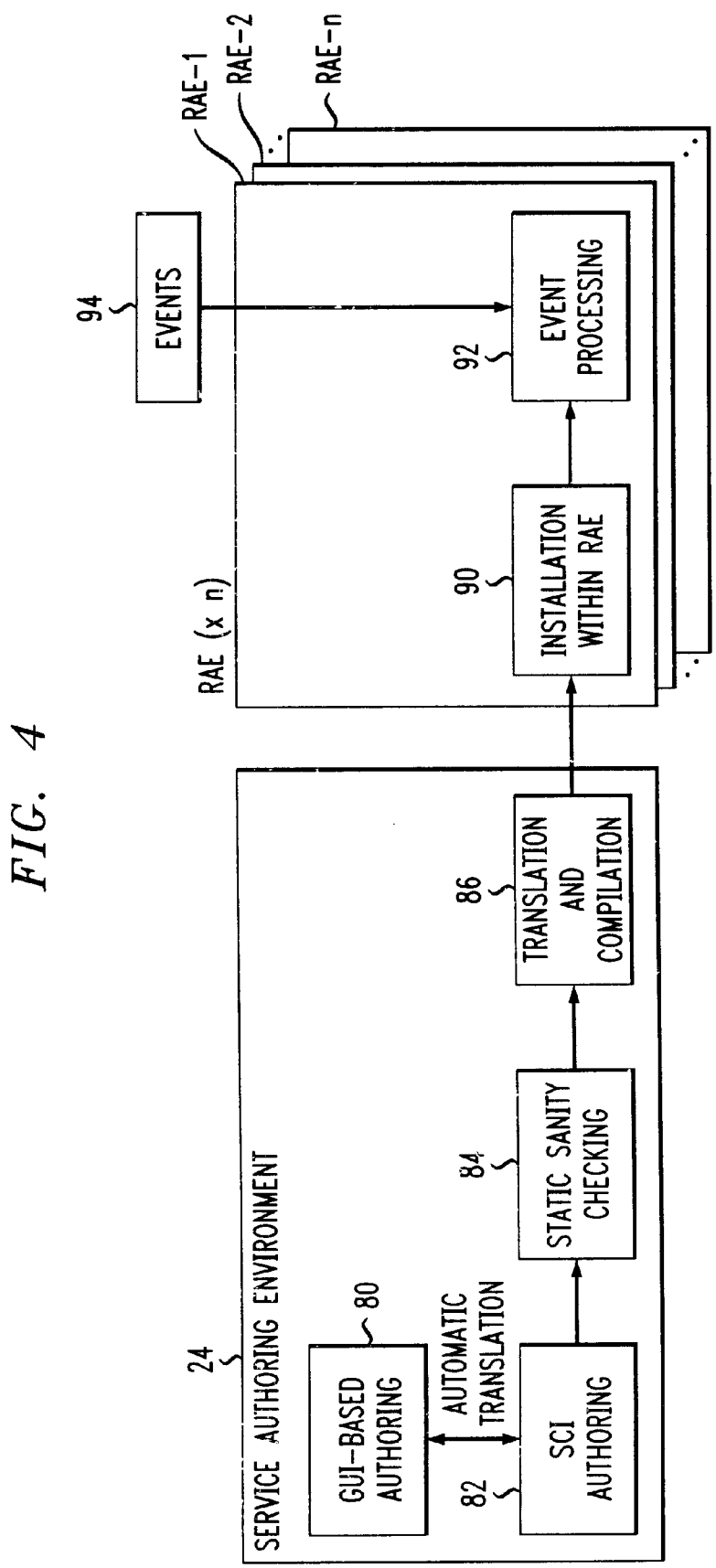
FIG. 4 illustrates the interaction between a service authoring environment (SAE) and a real-time analysis engine (RAE) in the real-time event processing system of FIG. 2.

FIG. 4 illustrates the interaction between the SAE 24 and a parallel implementation of n RAEs designated RAE-1, RAE-2, . . . RAE-n, showing the authoring, compilation and installation procedure for SAL scripts. The SAE 24 includes a GUI-based authoring procedure 80, a service creation interface (SCI) authoring procedure 82. Services can be authored using the GUI interfaces provided in the GUI-based procedure 80, or can be authored in SAL directly using the SCI authoring procedure 82. In either case, the result is a set of authored services, as described by SAL scripts. When these scripts are submitted, a static sanity checking procedure 84 is performed in order to ensure the correctness of the scripts. For example, SAL is statically typed, allowing a broad class of programming errors to be detected at compile time. Static type-checking also eliminates the overhead of maintaining and checking type information at runtime. Once a service has been validated, it is translated into C++ and compiled to native shared-object code, using a translation and compilation block 86. The resulting object code is then dynamically linked into one or more of the RAEs RAE-1, RAE-2, . . . RAE-n, as indicated by installation block 90, at which point the scripts are on-line. Once on-line, the scripts are ready for use in event processing block 92 in responding to events 94.

Performance tests were conducted on the above-described illustrative embodiment for a simple, update-intensive rating and discounting application. The illustrative embodiment as described in conjunction with FIGS. 1 to 4 was implemented using a SUN Microsystems workstation with a single UltraSPARC processor, and a conventional data warehousing system running on the same processor. The performance tests indicated a throughput on the order of 600 events per second. These results clearly demonstrate the performance capabilities of a general-purpose real-time EPS such as EPS 12.

Safety and Complexity Issues

In addition to type checking, two other static sanity checks are made possible by the declarative nature of SAL. These checks, also performed prior to translation, compilation and installation, address issues of safety and complexity, both of which have important performance implications.

With regard to safety, since service creation is a high-level, largely-declarative procedure, the safety of authored services can be guaranteed statically by the checking and translation process itself. For example, it is generally not possible to author services with errors such as infinite loops, memory leaks, erroneous updates through misdirected pointers, or segmentation violations. These features improve performance by relieving RAE of the burden of addressing safety issues at runtime. Given the inherent correctness of the checking, translation and compilation process, only a limited, well-defined and manageable set of error conditions (such as division-by-zero) can occur at runtime. As a result, authored code can be compiled and executed safely directly within the process space of the RAE itself. If these guarantees cannot be given, then dynamic mechanisms may be necessary for dealing with runtime errors. For example, authored services might be executed in a separate address space, as is done within client-server systems. This latter alternative, however, introduces considerable initialization, context-switching and data-marshaling overheads, all of which can be avoided here. Note, however, that ensuring the safety of authored code in this way does not in itself also ensure the correctness of that code. In particular, none of the features described here eliminates the need for conventional testing and debugging.

With regard to complexity, SAL provides a primitive set of programming constructs, and a small but rich set of declarative data-management constructs. This combination is attractive for real-time systems since the complexity of authored services can be analyzed statically. In many cases, SAL can give complexity guarantees and generate warnings if an authored service is potentially inappropriate for real-time event processing.

One key performance metric for real-time systems is predictability. The declarative nature of SAL makes it possible to distinguish code with constant or logarithmic complexity, from code whose complexity is proportional to the size of the database. Since this latter case may compromise predictability and real-time performance, it is flagged with a warning message, but not rejected. This gives an author the opportunity to reconsider the design of a service from a real-time perspective, eliminating a potential performance problem before it is introduced. Nevertheless, complex event processing can on occasion be unavoidable or appropriate. This might be the case, for example, if an event occurs only infrequently, or if the system's dynamics ensure that performance will in fact be satisfactory in practice (e.g., a scan of a table may be reasonable if the table has only a few entries), or if the task at hand is simply inherently complex. In these cases, an author might in fact validate code which, on the face of it, appears inappropriate for real-time processing. For these reasons, event-processing code generated using SAL need never be rejected automatically on the grounds of complexity alone.

Authoring Tables

FIGS. 5A, 5B and 5C show examples of three different types of SAL tables: base tables, chronicles, and views, respectively. The table is the primitive data structure provided by SAL. A base table is a regular, full-function table. The update operators for base tables are insert, update and delete, and the query operator is select. A view is a table whose contents are derived from the contents of other tables. Views have no update operators, only the query operator select. Chronicles are not stored within the EPS itself; instead an insertion into a chronicle results in an output from the system being generated. The only update operator for chronicles is insert, and the query operator select may appear over chronicles only in view definitions.

The examples shown in FIGS. 5A, 5B and 5C are loosely based on the above-described debit-based billing example. The base table custBalance in FIG. 5A may contain each customer's balance and usage. The chronicle CDROutput in FIG. 5B chronicles all the events processed by the system. The view totalCustCharge in FIG. 5C maintains aggregation information over CDROutput. It records the total charges assigned to each customer, and is maintained automatically as outputs are generated.

Authored services explicitly maintain the contents of base tables. For example, event processing may insert a record into a base table, delete a record from a base table, or update a record within a base table. Generally, base tables store either configuration data or summary data which cannot be maintained automatically as a view. As noted above, a view is a table for which no update operators are permitted; instead, the contents of a view are derived from the contents of other tables (frequently from the contents of chronicles). For performance reasons, views are always stored explicitly in the above-described memory store of the EPS. Their contents are updated automatically as a side-effect of events' updates to base tables and chronicles. Whenever possible (and always for views over chronicles), efficient algorithms for incremental view maintenance are used. Examples of such algorithms are described in H. V. Jagadish et al., "View maintenance issues for the chronicle data model," Proc. ACM SIGACT-SIGMOD-SIGART Symp. on Principles of Database Systems (PODS), San Jose, Calif., pp. 113–124, May 1995, and T. Griffin and L. Libkin, "Incremental maintenance of views with duplicates," Proc. ACM SIGMOD Intl. Conf. on Management of Data," San Jose, Calif., pp. 328–339, May 1995, both of which are incorporated by reference herein.

Both base tables and views are stored explicitly in the memory store of the EPS. Chronicles, on the other hand, are not stored within EPS. A chronicle models a stream of processed-event records. An insert into an chronicle is synonymous with a record being generated on an output stream. A view over an output stream aggregates summary information over all the events processed by the system. Frequently, chronicles represent either query results, or processed-event records that are delivered to a data warehouse for archiving. With respect to complexity, since an entire chronicle is not available for view maintenance, it is essential that views over chronicles be maintained incrementally, one record at a time. Also, views over chronicles generally must incorporate a group-by clause which bounds the space required for the view's materialization.

Authoring Event-Processing Logic

The above-noted SAL in the illustrative embodiment includes a set of primitive procedural programming constructs, and a set of declarative data-management constructs. The primitive procedural programming constructs include assignment, sequencing, and conditional execution, but not loops. The data-management constructs are restricted versions of the four table operators of SQL (insert, delete, update, and select), and a deprecated foreach operator. In particular, each operator accesses exactly one table in its from clause, and table names and table expressions may not occur elsewhere. With these restrictions, operations frequently correspond to rifle-shot dips into the memory store, which, with index support, can be executed in constant or logarithmic time. As such, these operators are well-suited to real-time processing.

FIG. 6 shows an example of a callCompletion event handler for a simplified stepped pricing plan whose rates vary depending on the current volume of usage a customer has generated. First, the customer summary information is accessed to determine the customer's usage, and then, based on that usage, a rate table is accessed to determine the rate for a call. Finally, the rate is applied to the call detail record (CDR) at hand. In general, the result of a select operation is a set of records. The "pick from" operator extracts a single member from that set (in this case it must be a singleton set). As this example illustrates, although restrictions are imposed on the data-management operators, relatively sophisticated functionality can be achieved by combining these simple operations. In the example, processing which could be expressed equivalently in terms of a join of the custBalance and rateTable tables, is instead expressed in terms of two rifle-shot select operations. This latter form is more appropriate to real-time event processing.

The above-noted foreach operator is a deprecated feature. While the insert, delete, update, and select operators above provide a powerful language for accessing and manipulating persistent data, their expressiveness is deliberately restricted in this illustrative embodiment. As a consequence, certain computations cannot be expressed in terms of these operators alone. For such cases, the foreach operator provides the ability to iterate over the results of a select expression, and, for each record in those results, a block of statements is executed. This is a compromise solution. It allows SAL to retain the "relational completeness" property of conventional relational systems, but at the same time encourages the authoring of event handlers which are appropriate to real-time event processing.

Figures 7, 8A:
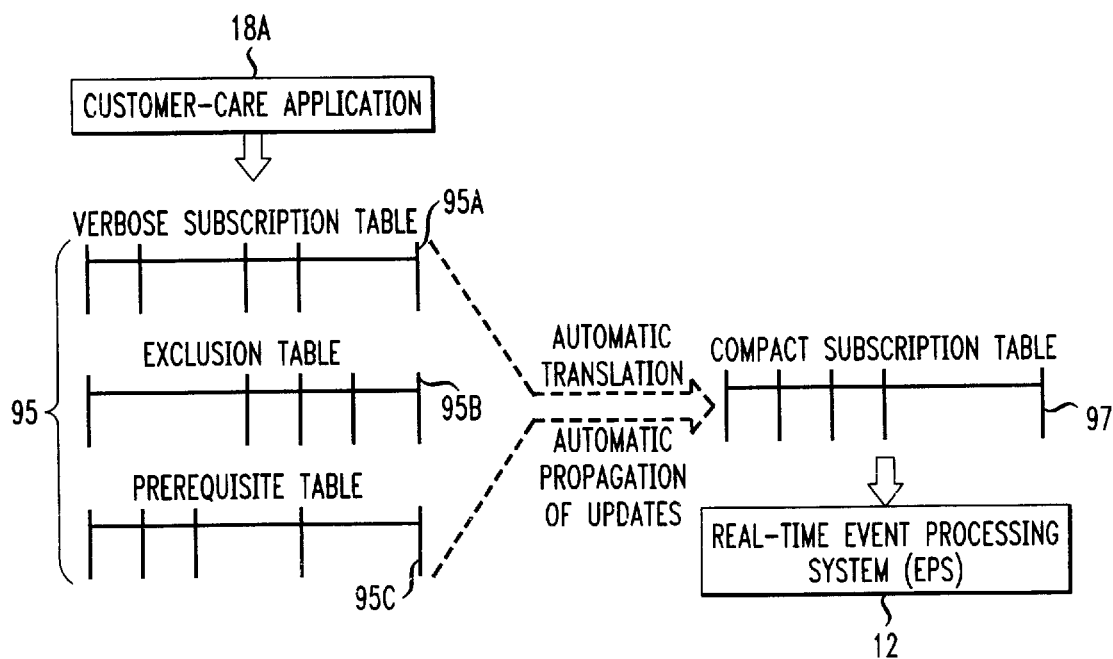
FIG. 7 shows a sample service/handler matrix that may be utilized in the SAE of FIG. 4.
FIG. 8A illustrates the relationship between verbose and compact subscription tables in a subscription model.

The authoring model used in the SAE is based on the above-noted concept of service. As noted previously, a service provides a coherent set of event handlers which together implement some unit of functionality. For instance, in the above-described debit-based billing example, event handlers for callConnection and callCompletion events generally work together in pairs, and each such pair is grouped into a single service. FIG. 7 shows a sample service/handler matrix for this example. An "O" in this matrix indicates that the service on the x-axis provides a handler for the corresponding event on the y-axis. An "X" in this matrix indicates that no handler is provided. For instance, the steppedPrice service provides handlers only for callConnection and callCompletion (as illustrated in FIG. 6), whereas the volumeDiscount service (which maintains per-subscriber summary information) also provides handlers for subscribeCustomer and unsubscribeCustomer.

SAL in the illustrative embodiment provides a set of features for defining services, events and event handlers. Event handlers themselves may be coded using the features described previously. Examples of a service and an event-handler definition were given in FIG. 6. In addition, associated with each event is a method for determining the subscriber for the event, and the time at which the event takes place (if that time is not simply "now"). This information is utilized by the subscription model described below. Also, a new service can inherit behavior from an existing service, redefining only those handlers whose functionality differs from that of the existing service.

Component Management

Components are packages that implement input handlers and services in the EPS. An "input handler" is a type of event handler. Components are generated by a translator/compiler that converts SAL code into dynamic linked libraries (DLLs) with some particular qualities that make them components and therefore usable by dynamic execution model (DEM) processes to be described in conjunction with FIG. 11 below. Components are linked into running processes and implement interfaces that describe the services provided.

A number of terms will be introduced, and then the component management aspects of the EPS will be described. An "interface" may be viewed as a contract between a process that needs a service and a component/dynamic element/dynamic library that provides the service. An interface includes a collection of messages/methods to which a service can respond. A message includes a name, arguments (data values passed into the service for that message) and a return value. A component is a packaging of a dynamic library into a resource that can be dynamically loaded, unloaded, reloaded, and tracked by a running process under internal or external (to the process) control. In the EPS, a component can support multiple interfaces, and maps directly into an input handler or service. An input handler describes how an input stream is broken into events, and describes the format, e.g., fields, arguments, etc., of each event. A service describes a collection of actions that are to be taken when any of a set of triggering events is seen. The EPS in the illustrative embodiment assumes that components maintain no state that can be relied upon between method invocations, thus enabling reliable dynamic reloading of components/services.

The following SAL extensions have been implemented to augment SAL capabilities for practical use within the EPS framework:

1. Implicit arguments semantics are supported that enable passing non-event, SAL-visible data into services from the invoking EPS processes.

2. EPS triggered events for component/service installation, uninstallation, and initialization.

3. EPS events triggered on low-level, e.g. DataBlitz™, errors.

Component management features of the EPS will now be described in greater detail. Operating systems typically provide a small set of system calls that allow dynamic libraries to be opened and used by a running process. For example, in Sun Solaris and Open Group's UNIX 98 standard, dlopen( ) opens a dynamic library (when provided a library name) and dlsym( ) (when provided a symbol name) returns a pointer/reference to a symbol/variable/data object defined in that dynamic library. Because dynamic library symbols are typically named according to C semantics only, C++ type safe names may be "mangled" and therefore not easily parsed by humans. In addition, support is generally not provided for tracking open dynamic libraries.

The following describes the implementation of components in accordance with the illustrative embodiment:

1. Each component implements a single ITABLE symbol that is extracted via dlsym( ).

2. An ITABLE symbol is a pointer to an array of interface name/VTABLE pointer pairs. The entries in this table represent the interfaces that the component supports.

3. A VTABLE consists of an array of pointers to functions. Each function implements a message/method of the associated interface.

The following describes one possible implementation of an interface:

1. An interface is implemented as a C++ class. All interfaces inherit from a base interface class. This base class provides a method for initializing the interface based on the name of a component. When an interface is successfully initialized, method calls on the interface are redirected to method implementations in the component.

2. The specified interface, as derived from the base interface class, provides a set of methods that the interface supports.

3. A generated interface contains a VTABLE pointer that is initialized to point to a VTABLE within a component when the interface itself is initialized to use a named component.

4. A method in the interface indexes a pointer in the associated VTABLE, and calls the function pointed to. The ordering of the method within the interface determines the index used, e.g., the ith method uses the ith pointer.

An exemplary technique for enforcing the contract between an interface and a component in the illustrative embodiment is as follows:

1. An interface is specified in an Interface Definition Language (IDL). The IDL provisions a name and set of method (message) signatures comprising the interface. Method signatures include method name, returned data type, and an ordered list of argument data types. Data types are any valid C++ types. Non-integral type definitions are provided through "include" syntax in IDL.

2. A tool is provided to generate an interface C++ class based on the IDL specification, and a "skeleton" component that consists of an ITABLE, a VTABLE for each interface supported, and "stubbed out," i.e., empty, functions that are intended to implement the defined methods. The SAL translator replaces the second tool and not only creates the ITABLE and VTABLES, but fills in the logic for the methods based on the authored SAL input handler services. In this case, the contract is enforced within the translator, and may be based on a number of design decisions derived from architecture/design sessions between developers, who, over time, refine the basic interfaces. The number of different interfaces used is small, supporting input handlers, services, and the subscription model.

3. Because interfaces define hard contracts between running processes and components, they are compiled into the process code.

An exemplary component management structure will now be described. The description uses certain object-oriented design concepts, as described in, e.g., E. Gamma et al., "Design Patterns: Elements of Reusable Object-Oriented Software," Addison-Wesley, 1995. The component management participants and activities in the illustrative embodiment are as follows:

1. The Component Manager is a singleton (one per process) object that tracks the pool of loaded components on behalf of a process. This object responds to requests to load, unload, and reload components.

2. The Component Proxy represents a loaded component (there is a one-to-one relationship between loaded components and Component Proxies). The Component Manager has information about loaded components via loaded Component Proxy objects. The Component Manager object delegates the loading, unloading and reloading of a component to a corresponding Component Proxy object.

3. An interface object registers with the Component Manager its interest in using a named component. The Component Manager looks up the named component; if it exists, the registration is delegated to the Component Proxy. Otherwise, a new Component Proxy is created, the component is loaded, and then the registration is delegated.

4. Registration with a Component Proxy causes the proxy to track a reference to the interface, and to set the VTABLE pointer within the interface to the appropriate VTABLE within the component. Method calls on the interface (and thus into the component) are now possible.

5. Requests to unload or reload a component are directed to the Component Manager, and are in turn delegated to the appropriate Component Proxy. A Component Proxy will not permit an unload if an interface is using the component. Reloads are allowed at all times, subject to certain restrictions (reloads cannot occur if a thread of execution is currently within a component subject to reloading).

6. A reload of a component conventionally invalidates any VTABLE pointers in interfaces using the component. Because a Component Proxy tracks these interfaces, the proxy walks through the set of registered interfaces and updates the VTABLE pointer in each to point to the new instance.

A service introduction implementation suitable for use in the EPS is as follows:

1. An authored input handler/service is translated into a component (a dynamic library with the properties described above).

2. Components are placed in a repository where they are eligible for loading into the EPS.

3. An operator decides to load a component into the EPS and sends the message to a master process, e.g., an Operations, Administration and Maintenance (OAM) master process. This process is responsible for coordinating dynamic service introduction throughout the EPS.

4. The master coordinates what amounts to a standard two-phase commit approach for introducing the component into the EPS. Basically, all appropriate EPS processes are advised to prepare to load (or unload or reload, as appropriate) the new component. If all parties vote that preparations are successful, the go-ahead to enact the operation is given. If any vote the action down, all parties are notified to cease the operation attempt.

5. The component manager tracks loaded components and the associated interfaces using the components.

The basic flow of an event through the EPS is illustrated in the following:

1. Event sources in this example are typically TCP/IP socket connections, but they can also be files, programs, or functions.

2. A data collection and mapping element, referred to herein as a data collection interface (DCI), sets up an event channel for each loaded input handler. A watcher thread of execution waits for connections (if TCP/IP based) on the channel, and spawns a thread to handle each connection.

3. The spawned thread opens the channel, and calls through an interface to the appropriate input handler component. The input handler reads bytes off of the channel until an event is identified. The identified event is passed back to DCI. The thread places the event on a queue.

4. A mapping thread pulls events off of the queue. Serialization and logging, relevant for the recovery process to be described below, occurs here. The event is demultiplexed/routed to the appropriate downstream handling process in the appropriate cluster (see FIG. 11). High throughput events are directed to the RAE process. Maintenance events, i.e., events with no particular performance requirements, are directed to a daily maintenance process. End-of-cycle (EOC) and other cyclic/periodic events are directed to an EOC RAE process. Queries and events with low latency requirements are directed to a query manager process.

5. A downstream process, e.g., RAE, daily maintenance, EOC RAE, query manager, etc., receives an event. Subscribed events, i.e., events described in SAL as having a subscriber ID, may be directed to a hand-authored (non-SAL) subscription component through a specialized interface for that component. The subscription component looks up the subscriber, looks up the appropriate subscription string(s) (per global preprocessing, postprocessing, and per-subscriber), which may be derived from subscription language (SL) statements and based on the subscriber, event date and effectivity dates associated with the subscription string. The SL identifies the service and event handler (mapping into the appropriate component) that must be called for the event. The subscription component calls the services in sequence through cached (for performance reasons) service interfaces, causing unloaded services to be loaded as required.

6. Services may write to SAL-defined chronicles, which are write-only streams whose sinks are processes, TCP/IP sockets connections, files, and functions. The DW/ES and querying client are two special cases of these chronicles.

7. Note that all events pass through a single method in the service interface into a service component. Generated component code handles demultiplexing the events.

Subscription Model

Generally, conventional database systems support two classes of queries: ad hoc queries and canned queries. Ad hoc queries are flexible, but incur considerable overheads due to parsing and optimizing costs at runtime. Canned queries, on the other hand, eliminate the overhead of ad hoc queries, but at the expense of flexibility. The EPS in the illustrative embodiment strikes a balance between these two extremes by using a subscription model, which minimizes the overhead of event processing, while retaining much of the flexibility of ad hoc query-processing systems.

Subscriptions are the linkages between an entity-based event that enters the EPS framework and the actions, i.e., services, that should be executed for that event. For example, in a telecommunications billing application, when a call complete event arrives, the billing plans in which the given customer is enrolled should be invoked appropriately. Not all events that enter the EPS framework are subscribed events, so it is important to appreciate the distinction between mapped events, i.e., mapped by customer to the appropriate cluster (see FIG. 11), and subscribed events. For example, priming data for a customer summary is a mapped event, because it must be routed to the appropriate cluster based on the customer ID, but the subscription logic is not relevant, so it is not a subscribed event.

The details of this approach will be illustrated in terms of an example based on the debit-based billing system discussed previously. In this case, the set of events might be those on the y-axis of the service/handler matrix of FIG. 7, while the services are on the x-axis. In this example, the distanceRate service provides handlers for four events, whereas the volumeDiscount service provides handlers for all events except addCustomer, removeCustomer and customerDeposit. Two classes of events are supported: non-subscribed events and subscribed events. All events in the example are non-subscribed except callConnection and callCompletion.

When a non-subscribed event occurs, the corresponding handler of each service which provides a handler for that event is invoked. For example, when an addCustomer event occurs, only the handler from the debitMonitorPre service is invoked. When a subscribed event occurs, the services to invoke, and their ordering, are determined by looking up the subscription table. In the case of the callConnection and callCompletion events, the subscriber is the customer to whom the charges for a call should be allocated. Based on that customer's identifier, the subscription table is accessed to determine the services to which the customer subscribes. For example, one customer may subscribe to the services internationalRate and flatRateRate, while another may subscribe to flatRateRate and volumeDiscount, etc. Only the handlers for subscribed services are invoked. In this way, event processing for subscribed events involves the invocation of a set of canned handlers. However, the way events are handled depends upon the subscriber, and the corresponding entry in the subscription table at the time an event occurs. This approach retains much of the flexibility of ad hoc systems, but without the performance overhead of ad hoc query processing.

Subscription tables may be implemented using a number of different approaches, including a verbose approach and a compact approach. Under the verbose approach, information about individual dependencies is recorded in different entries, perhaps scattered across a set of subscription tables. As such, a considerable amount of effort must be expended at event-processing time to collate and interpret the subscription information relevant for a particular event. Moreover, this effort must be repeated for every event processed. The compact approach eliminates this repeated effort by encoding subscription information in a single, compact entry in a single table. Thus, only a single entry must be accessed to determine all the subscription information necessary to process an event. Entries in the compact subscription table are encoded in a minimal subscription language which, although sufficiently rich to encode complex dependencies mentioned above between subscriptions, is compact, and can be interpreted with very-low overhead at event-processing time.

FIG. 8A illustrates that the above-described verbose and compact subscription representations can be complementary. For example, verbose subscription tables may be maintained for applications such as auditing and customer care, whereas a compact subscription table representing essentially the same information may be used for real-time event-processing. Updates to entries in the verbose tables are propagated automatically to the compact table whenever updates take place. In the example of FIG. 8A, a set of subscription tables 95 are maintained for a customer care application 18A. The set of subscription tables 95 include a verbose subscription table 95A, an exclusion table 95B, and a prerequisite table 95C. The set of subscription tables 95 is subject to automatic translation and automatic propagation of updates to generate a corresponding compact subscription table 97. The compact subscription table 97 is used in EPS 12 for real-time event processing.

The operation of the subscription model will now be described in greater detail, with reference to an illustrative compact subscription table as shown in FIG. 8B. Given an event with subscriber sub and time stamp ts, this table contains a unique entry S such that:

S.subscriberId=sub and

S.startTimeStamp <=ts and ts <S.endTimeStamp

The explicit subscription term for an event is then given by S.subscription. With appropriate index support, this term can be accessed in constant time. Two special identifiers, preProcessingSub and postProcessingSub, also have entries in this table. These entries represent implicit subscription terms to which, in addition to their explicit subscription terms, all subscribers subscribe.

The complete subscription term for an event is derived by concatenating the pre-processing subscription term, the explicit subscription term, and the post-processing subscription term, in that order. Moreover, the pre- and post-processing terms can be cached between events, so they do not in fact require a lookup operation. For example, if an event for "Frank" occurs during August 1997, then the complete subscription term for the event would (schematically illustrated) be:

- - - d - - - ; - - - b - - - ; - - - e - - -

This term then defines the services whose handlers are used to process the event. The key advantage of this approach is that a single table lookup accesses all the subscription information for an event. Subscriptions themselves are encoded in a small but flexible subscription language. For example, flatRateRate;
volumeDiscount;

indicates that the handler of the flatRateRate service should be invoked first, followed by the handler of the volumeDiscount service. Terms in this language are then compiled to a very compact form (such as represented here schematically as - - - a - - - ). This compact form is ideally suited to efficient run-time interpretation with minimal CPU and memory space overheads. The compact approach can be contrasted with existing subscription-based systems in which subscription information spans several tables, or even several entries within each table. The compact approach avoids almost all of the overhead associated with run-time data-access and interpretation for each event.

The above-noted flexible subscription language is designed such that it can be compiled to the compact form, which can be interpreted by a simple and efficient interpreter. The complete syntax of an illustrative subscription language is shown in FIG. 9. Each term in the syntax captures two semantic notions: first, whether a particular service is enabled for an event, and second, the order in which the services are enabled for an event. As previously noted, only the handlers of enabled services are invoked, and they are invoked in the order in which they are enabled. The term "serviceId" is assumed in this example to incorporate a service name, together with an instance identifier for the service. It should be noted that the concept of instances is useful for services such as stepped or tiered pricing plans, where instance-specific step and tier information is stored in provisioning tables.

The term "NOTHING" in the syntax of FIG. 9 indicates that no services are enabled for the event, and a term of the form "serviceId" indicates that the named service is enabled. The term "$SL_1$; $SL_2$" captures ordering of subscription terms. All services enabled by $SL_1$ are enabled, and all those enabled by $SL_2$ are enabled, in that order. For example, a term:

internationalRate; volumeDiscount enables internationalRate and volumeDiscount, in that order. Whenever, e.g., a callCompletion event occurs, first the callCompletion handler of the internationalRate service is invoked, then the callCompletion handler of the volumeDiscount service is invoked.

Delegation allows the explicit subscription term of another subscriber to be invoked. When encountered, the compact subscription table is accessed, and the explicit subscription term for the named subscriber is retrieved. This is then invoked in place of the delegation term itself. Pre- and post-processing terms are not invoked. This feature has at least two uses. It can be used to implement customer hierarchies where, e.g., the subscription for a parent must be invoked for a child, and it can also be used to introduce structure and modularity into subscriptions, at the cost of additional table accesses.

The form "IF serviceId $SL_1$ [ELSE $SL_2$]" in the FIG. 9 syntax captures conditional invocation and qualification. The ELSE branch is optional. Either those services enabled by $SL_1$ will be enabled, or those enabled by $SL_2$ will be enabled. These cases are distinguished as follows. Assume some event eventName occurs. If the service serviceId has a handler for eventName, then that handler is invoked. The result is required to be a boolean value. If the result is true, then the handlers enabled by $SL_1$ are enabled, otherwise those enabled by $SL_2$ are enabled (if $SL_2$ is present). If serviceId does not provide a handler for eventName, then the services of both $SL_1$ and $SL_2$ are enabled.

Mutually-exclusive services and prerequisite services are captured by terms of the form:

serviceId* EXCLUDE SL
serviceId* PREREQUISITE SL

For exclusion, the services enabled in SL are enabled only if all of those named in the exclusion list have not already been enabled. For prerequisites, the services enabled in SL are enabled only if at least one of those named in the prerequisite list is already enabled. These semantics allow an exclusion requiring none of a set of services to have been enabled to be expressed as a sequence of exclusions, or a prerequisite requiring all of a set of services to be enabled to be expressed as a sequence of prerequisites. For example, if the internationalRate and the distanceRate services are mutually exclusive, then the term:

internationalRate EXCLUDE distanceRate ensures distanceRate will be enabled only if internationalRate is not enabled. If, in addition, the volumeDiscount service is only applicable for distanceRate calls, then the extended term:

internationalRate EXCLUDE distanceRate; (distanceRate PREREQUISITE volumeDiscount)

ensures that volumeDiscount is enabled only if distanceRate is enabled. Note that both the forms above assume "or" semantics between the services listed. The alternative "and" semantics can be achieved by sequences of EXCLUDE or PREREQUISITE terms.

The form "FIRST eventName+SL*" in the FIG. 9 syntax ensures that only one of a number of possible subscription terms is enabled. When one of the named events occurs, the subscription term to be enabled is the first one in the list SL* for which at least one service would be enabled. When any other event occurs, all the services which are enabled in at least one of the sub-terms are enabled.

Another possibility is that of having several subscription terms, of which a particular "best" one applies. This situation is captured by the FIG. 9 syntax as follows. The event handlers of each of the given subscription terms are invoked, but only provisionally, and the best is selected from these candidates in accordance with some predetermined criteria. The available forms are:

MAXIMUM eventName expression SL*
MINIMUM eventName expression SL*

The "expression" selects either one of the eventName's intType arguments, or an intType field of one of eventName's record arguments. Whenever an event eventName occurs, each term in SL* is evaluated provisionally, and the expression is evaluated. The term with the maximum is selected, and only the services enabled by this term are then deemed to be enabled. The results of all other provisional invocations are discarded. For events other than the named event, the services of all of SL* are enabled.

The illustrative subscription language described above is sufficiently expressive to handle a variety of non-trivial subscription issues. However, the language also has the advantage of simplicity. In particular, the language is sufficiently simple that it is possible to encode any term of the subscription language in a prefix form which is ideally suited to real-time interpretation. This is illustrated for some of the examples above as follows, although it should be understood the compiled versions will be in a machine-readable encoding of this prefix form.

; internationalRate volumeDiscount
EXCLUDE 1 internationalRate distanceRate
; EXCLUDE 1 internationalRate distanceRate PREREQUISITE 1 distanceRate volumeDiscount A very simple interpreter for this form can be implemented in a straightforward manner as a simple switch statement with a case for each of the ten forms described above.

In practice, the subscription process itself can be complex. For example, services may be active only for a particular time period, there may be ordering dependencies between subscriptions, some services, e.g., those implementing taxation, may be subscribed to implicitly by all subscribers, an event may need to "qualify" for a service, or there may be "preclusion" or "prerequisite" dependencies between services. The subscription language of the illustrative embodiment, as shown in FIG. 9, is sufficiently rich to capture these and a variety of other classes of dependency between services and between subscriptions.

It should be noted that the subscription model may include a number of more advanced features. For example, services can be organized into an inheritance hierarchy, whereby a new service inherits all the handlers of an existing service. By redefining one or some of a parent's handlers, an existing service can be adapted to new requirements. Also, certain services can be designated as "pre-processing" or "post-processing" services, thereby ensuring that their handlers are always the first or the last to be invoked for an event. This would be the case for the debitMonitorPre and the debitMonitorPost services in the example. Typically, the event handlers of pre-processing services perform initialization tasks for other handlers, and the event handlers of post-processing services perform final computations, update summary information which is not owned by any individual service, and generate outputs. Other features that may be included in the subscription model are implicit subscription, conditional subscription (or "qualification"), mutual exclusion, and optimization.

Authoring Input and Output Streams

Many of the target applications for the EPS 12 are implemented as adjunct services to embedded systems, such as network switches. To support data exchange with such embedded systems, the EPS supports stream-based external interfaces, as illustrated in FIG. 2. As previously noted, an input or an output stream may be, e.g., a sequence of records, transmitted over a TCP/IP connection or other suitable connection. The authoring of input and output streams involves describing the physical record formats which can occur on a stream, identifying key features embedded within those records, such as format descriptors and length indicators, and defining mappings between record formats.

When the EPS interfaces with existing systems, a number of complications may arise. For example, stream formats generally conform to existing standards, and the EPS must be capable of interfacing with systems which use those standards. As another example, streams are frequently nonhomogeneous, with a single stream comprising a variety of different record formats. The above-described SAL provides several features for addressing these issues. One feature is the ability to perform normalization over multi-format input streams. Under this approach, even if there are several input formats on a stream, these are transformed into a single internal format on arrival, and only this uniform internal format is processed within the EPS.

For instance, consider the previously-described fraud detection/prevention example, which is based on processing streams of call detail records (CDRs). About fifty different CDR formats arise in practice, and the authoring process can be simplified if it is made independent of these individual formats. This may be achieved in three stages: by authoring each physical record format, superimposing a normalized record format over the physical record format, and providing a normalization for each CDR format.

FIG. 10A illustrates this normalization process for two CDR formats, exampleCDRType1 and exampleCDRType2. Services are authored not in terms of either of these specific formats directly, but rather in terms of the third, normalized format, CDRNormalType. A normalization is declared for both of the CDR formats, and these normalizations are used to map CDRs to the normalized form for processing.

Unfortunately, although this approach simplifies authoring, normalization is "lossy." For instance, in the FIG. 10A example the sensor field of exampleCDRType1 does not occur in the normalized form, and is therefore discarded by the normalization process. As a consequence, this approach is satisfactory only if down-stream processing does not rely upon a record's specific input formats. To overcome this difficulty, a second form of normalization, referred to as abstract normalization, is provided. Abstract normalization is based on the concept of an abstract record type. Abstract record types are similar to concrete record types, but they define an interface to a group of record formats rather than a physical record format. In this case, mappings between these concrete and abstract record types allow a single interface to be used to process records that have a variety of different underlying physical formats, without requiring normalization to be performed.

FIG. 10B shows the abstract normalization which results if the declaration of the type CDRNormalType in the FIG. 10A example were given not as a concrete type, but rather as an abstract type. In this case, if the underlying record is of type exampleCDRType1, then any reference to an abstract field duration is replaced transparently with a reference to the underlying concrete field duration. If the underlying record is of type exampleCDRType2, it is replaced with the expression "minutes+60* hours." By defining events in terms of abstract records, multi-format inputs are mapped to multi-format outputs, without loss of information. A limitation of abstract normalization, however, is that updates are restricted. In particular, an abstract field may be updated only if, for every normalization, its mapping is defined as a simple arithmetic mapping of a single field in the underlying concrete record type. In the FIG. 10B example, for instance, neither the duration nor the callTimestamp field may be updated.

Alternative Embodiment Based on Dynamic Execution Model

Figure 11:
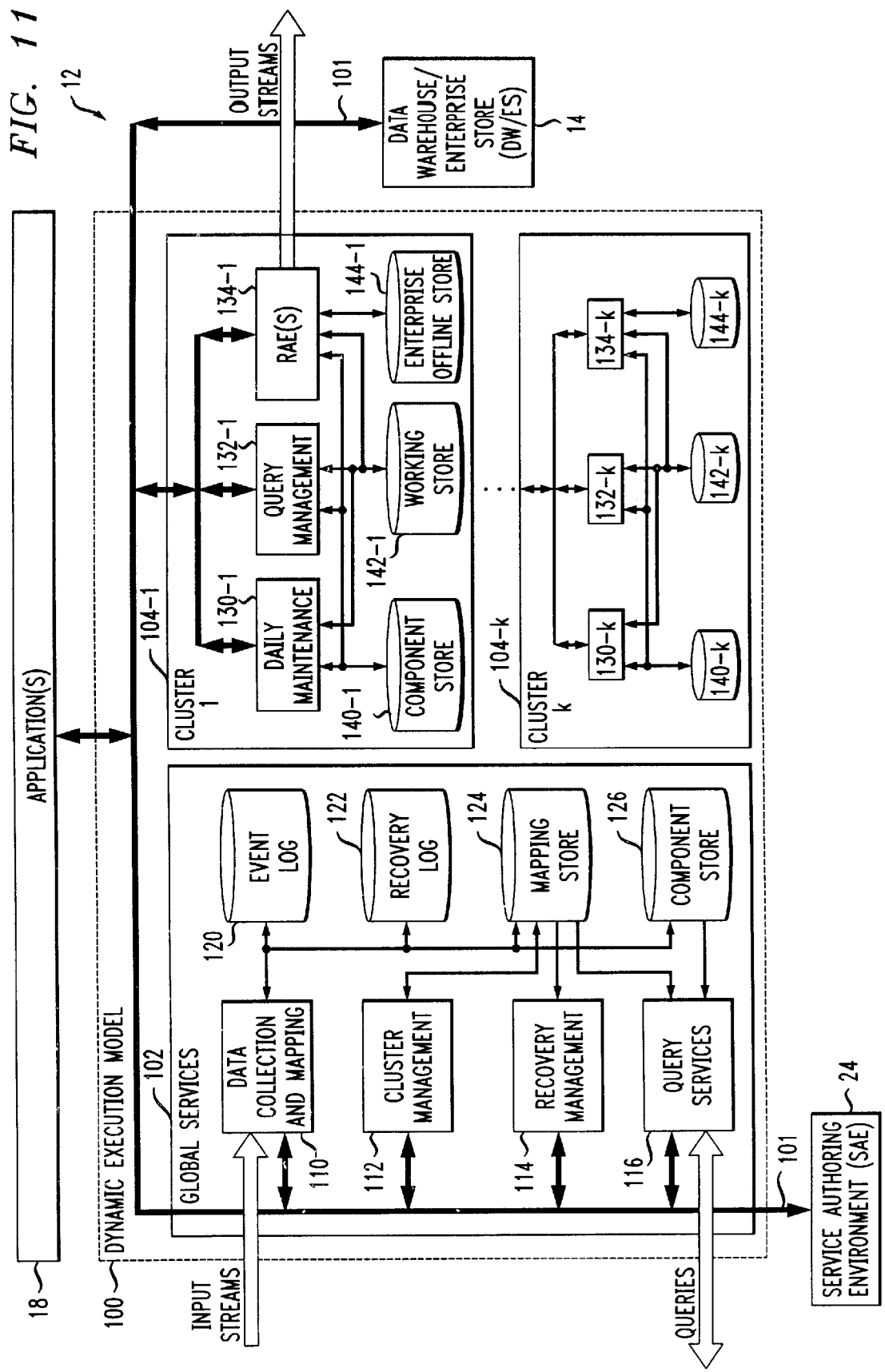
FIG. 11 shows another illustrative embodiment of the invention, based on scalable clusters of RAEs.

FIG. 11 shows an alternative embodiment of the real-time EPS 12 of FIG. 1. The EPS 12 in this embodiment includes the SAE 24 as previously described, and a set of k clusters of RAEs configured in the form of a dynamic execution model (DEM) 100. The DEM 100 receives input streams, generates output streams, and processes queries, in a manner similar to that described in conjunction with FIG. 2. The DEM 100 interfaces with data warehouse/enterprise store (DW/ES) 14, application(s) 18 and SAE 24 via a bus 101. The DEM 100 includes a set of global services 102 and the set of k clusters 104-i, i=1, 2, . . . k. Each of the clusters 104-i may include a set of n RAEs arranged as shown in the FIG. 3 embodiment. The global services 102 include a data collection and mapping element 110, a cluster management element 112, a recovery management element 114, and a query services element 116. The global services 102 further includes an event log 120, a recovery log 122, a mapping store 124 and a component store 126. Each of the clusters 104-i includes a daily maintenance element 130-i, a query management element 132-i, and a set of one or more RAEs 134-i. Each cluster 104-i further includes a component store 140-i, a working store (WS) 142-i, and an enterprise offline store 144-i.

The DEM 100 allows authorable components as well as priming and updating objects to be dynamically loaded at runtime, as needed. It is used by any EPS process that needs to access the methods of a service or authorable component. All knowledge about a service or authorable component is encapsulated within these dynamically loaded objects. Each authorable component contains information about its event type and state. A dynamic service is then triggered according to the event type and performs some processing according to the authorable component's state. The EPS is thereby insulated from specific knowledge about the authorable component, such as the tables kept in the WS and the methods used during "trigger-based" processing. A task such as end-of-cycle (EOC) processing becomes an instance of a trigger-based processing and is handled by a RAE. The introduction of new services is also simplified. Since new services can be defined and dynamically loaded at runtime, the system does not have to brought down and rebuilt. Thus, any process that utilizes the methods of a service can access newly loaded objects without having to be recompiled and restarted.

The DEM 100 may be implemented using dynamically linked libraries (DLLs). In this approach, a translator parses the authorable component's definition file (generated by the SAE 24) and produces a C++ class that can be compiled into a DLL. The authorable component is introduced into the DEM 100 through a given daily maintenance element 130-i, which stores information about the name and location of the DLL in the corresponding WS 142-i. As an example, at runtime, when a RAE needs the service to process some data object such as a call detail record (CDR) or when the daily maintenance element 130-i needs to subscribe a customer to a service, the DLL is loaded as it becomes available and the methods within the DLL can be accessed. Reloading of the DLL occurs if an update to the DLL comes in.

The functional interface between a process and the DLLs is defined by the basic component type, an abstract base class. In this embodiment, all authorable components must inherit from a basic type. The basic component type contains a set of virtual methods that a process invokes to perform an authorable component-specific action. An authored component can override these virtual methods to provide its own specific functionality.

As shown in FIG. 11, the DEM 100 may include k clusters 104-i. Each of the k clusters 104-i resides on its own processor and includes its own WS. Events are mapped to the correct DEM cluster 104-i by the data collection and mapping element 110. Query events are mapped to the correct DEM cluster 104-i by the query services element 116. The DEM 100 is transparent to its clients since requests are handled by specific mappers.

The EPS in the distributed configuration of FIG. 11 must adjust to changes in the number of clusters 104-i and the number of customers. The number of clusters may change as a result of, e.g., adding or deleting processors from the system. When the number of clusters changes, the EPS 12 may migrate some customers from one or more clusters in the old configuration to a new cluster. Migrating customers involves moving the customer profile and summary tables from a source cluster to a target cluster. An important observation is that hierarchically-treated customers generally must be kept in the same cluster in order to maintain accurate summary information and hence accurately process the events. An example of a mapping method which takes into account hierarchically-related customers, and possibly other exceptional cases, requires that the data collection and mapping element 110 have access to a database instance for the purpose of mapping. This database instance may be, e.g., a DataBlitz™ database instance.

Another issue in the embodiment of FIG. 11 is how initial segmentation of the customer set occurs. One possible strategy is to first subdivide the customer set into simple customers and exceptional customers. Exceptional customers are hierarchically-related customers and customers that have constraints on them that force location in a particular cluster. For the simple customers, a functional mapping may be used. An example of a functional mapping is to assign a simple customer to cluster i, where i=X mod k, where X is the customer ID and k is the number of clusters. Though the cluster mapping for these simple customers can be computed easily, it may still be desirable to maintain their mapping in the mapping store 124 for symmetry as well as migration management.

For the exceptional customers, an administrator may be used to determine what clusters they will be assigned to, and a mapping of customer ID to cluster number is maintained. The type of exception condition may also be maintained to help guide migrations. The cluster management element 112 implements a process to create and maintain this mapping. As an event enters the data collection and mapping element 110, that element in conjunction with the cluster management element 112 determines the correct cluster either from a mapping table in the mapping store 124 or the above-described functional mapping.

Migration in the FIG. 11 embodiment may be viewed as an administrative task that occurs off-line, and may include the following steps:

1. Select the customers to be migrated and the target cluster. Alternatively, all of the simple customers may be redistributed via the functional algorithm.

2. Applications may at this point wish to add to the migrating customer set any hierarchically-related customers not explicitly designated.

3. Simple customers may be migrated individually. All customers in a given hierarchy must be in the same subset, and customers in the same subset will be migrated together.

4. Change the mapping table in mapping store 124 so that the migrated customers are now mapped to the target cluster.

5. Copy all customer profile data and summaries from the source cluster to the target cluster.

6. Delete the customer profile data and summaries on the source cluster.

7. Update processed transactions for the migrated customers to refer to the target cluster. Plan summaries will generally not be affected, e.g., in terms of a delta being applied, as a result of customers being migrated. Though the plan summary in a given cluster may not accurately reflect the actual customer participation within that cluster after migration, the aggregate of that plan's summaries across all clusters will accurately show the participation of all customers for that plan. There does not appear to be any need to maintain plan summaries reflecting cluster participation, since clusters are a feature of the system architecture rather than logical service concepts.

Fault Tolerance and Recovery

Fault tolerance and recovery features of the EPS 12 will be illustrated below using the embodiment of FIG. 11. In order to be self-sufficient in its ability to recover from software failures, the EPS in this embodiment keeps local copies of all inputs coming into it from external sources. This process may be implemented in the data collection and mapping element 110, and is responsible for knowing what external inputs are coming into the EPS, knowing how to receive each external input, knowing how to map an input to the proper EPS cluster or clusters, and knowing how to convert each input into an appropriate file. The process also attaches a serial tag to every data input coming into the EPS. This tag is used to identify records in a stream and for recovery purposes.

The EPS in this embodiment needs to be able to recover on a per cluster basis. In order to accomplish this, the input files created by the data collection and mapping element 110 are organized on a per cluster basis. The input types coming into the EPS, and their corresponding handlers and mappers, are shown in the following table.

| Input Type | Handler | Mapper |
|---|---|---|
| Queries | Query Services 116 | Query Services 116 |
| Events | RAE 134-i | Data Collection/Mapping 110 |
| Maintenance | Daily Maintenance 130-i | Data Collection/Mapping 110 |
| Triggers | RAE 134-i | Data Collection/Mapping 110 |
| Service Plans | Daily Maintenance 130-i | Data Collection/Mapping 110 |

Queries are generally read-only and do not need to be recovered. This means that if the cluster goes down prior to servicing a query, the application will need to detect and handle this. This policy will need to be declared. Hence, queries generally do not need to be buffered to a file. It should be noted, however, that based on application needs, it may be possible to identify certain classes of updateable queries that require buffering in global services, e.g., in a prepay billing application, locking an account while a call is in progress. Due to overlap between queries and other events, it may be desirable to merge the functions of the data collection and mapping element 110 and the query services element 116.

As will be described in greater detail below in conjunction with FIGS. 12 through 15, the EPS 12 implements a strategy of establishing recovery points at predetermined intervals and, when necessary, recovering to the first recovery point just prior to the last transaction committed by the DW/ES 14 for the cluster. In order to manage synchronization between a RAE 134-i handling events, triggers, etc. and the daily maintenance element 130-i handling maintenance inputs, all maintenance activities are performed immediately after establishing a recovery point but before starting event processing. It should be noted that delays imposed on daily maintenance processing as a result of deferring daily maintenance events until after establishing a recovery point may be undesirable in some applications. Other techniques may therefore be used to coordinate the timing for recovery point establishment, and daily maintenance events may be processed as they are received, subject to factors such as system load, etc.

A similar concern arises for service plans. This concern is addressed by establishing a policy that service plan changes (new or modified) will only be introduced after each recovery point and before any other processing (maintenance inputs, transactions, events/triggers). Daily maintenance will need to be able to back out service plan changes from a given recovery point. The WS effects may be automatically backed out by DataBlitz™ recovery, but the file system changes, e.g., DLLs, will need to be handled, by perhaps keeping previous versions only when changes are introduced. So essentially the daily maintenance element will be responsible for establishing recovery points only for service plan impacts to a flat file store. Other service plan changes to the DW/ES 14 will not be rolled back. This will require the DW/ES 14 to filter these duplicate requests in recovery, similar to what it needs to do for processed transactions.

Recovery on a per cluster basis in the FIG. 11 embodiment requires all inputs to be mapped to the cluster prior to being stored to disk for recovery. The data collection and mapping element 110 takes input streams or files and maps them to the appropriate file in the recovery log 122, and is also responsible for reading the recovery log 122 and delivering inputs to the appropriate cluster process. The data collection and mapping element 110 includes readers for obtaining input streams, mappers for mapping input streams to cluster recovery files, and senders for delivering data from recovery files to the appropriate clusters. Readers, mappers and senders are implemented by the same process.

Although DataBlitz™ can recover to the last transaction, the DW/ES may lag during recovery due to volume aggregation issues. This issue may be addressed by rolling the WS and flat file store back to the last recovery point just prior to the last committed DW/ES transaction for that cluster. Customer migration adds another level of complexity to recovery. In the FIG. 11 embodiment, this issue may be addressed by requiring all customer migration to occur in non-service periods, e.g., scheduled maintenance periods, for the EPS. Other embodiments may be configured which allow the customer migration to occur during service periods.

FIGS. 12 through 15 illustrate a detailed example of recovery management which may be implemented in the EPS 12. The recovery management in this example ensures that events (e.g., CDRs, priming data, etc.) are reliably processed by the EPS 12, even if one or more system elements, such as the DCI, a cluster process (e.g., RAE, dmserv, etc.) or the memory store crash or otherwise fail. An aspect of this reliability is the assurance of the consistency between events processed by a given cluster 104-i and processed events (e.g., events with EPS-added data) received by the DW/ES 14.

A well-known conventional solution for ensuring data synchronization between multiple data stores is to employ a "two-phase" commit approach in which a Transaction Processing (TP) monitor or other overseeing entity coordinates transaction commits between all data stores participating in a transaction. In this approach, all participating data stores are queried for preparedness to commit. All data stores vote, and if all vote in the affirmative, each is instructed by the overseeing entity to go ahead and commit. A single negative vote causes the transaction to be "rolled back," i.e., all data store entities, tables, rows, etc. are returned to a state prior to the start of the transaction. A problem with this approach with respect to the EPS 12 is that the slowest data store, i.e., the DW/ES 14, determines the throughput rate for the entire EPS, and the overhead of constant resynchronizations, with each commit involving multiple communications between clusters and the DW/ES 14, would severely impede the overall throughput.

The above-described conventional two-phase commit approach can be considered a "pessimistic" data synchronization approach because, at every commit time, all data stores are known to be consistent with one another. In contrast, the approach illustrated in FIGS. 12 through 15 ensures a high level of throughput by employing an "optimistic" data synchronization approach. In this approach, the memory store and the DW/ES are only known to be synchronized when a given cluster, or an individual process within it, is started. This approach avoids the need for constant resynchronization at every commit, such that the memory store can be allowed to perform more or less at its maximum capacity.

The recovery management as illustrated in conjunction with FIGS. 12 through 15 makes use of a DataBlitz™ feature known as recovery points, or time stamp recovery. Recovery points may be viewed as "markers" that are inserted, on demand, e.g., by the EPS 12, into stable DataBlitz™ redo logs. A recovery point represents a transactionally consistent state of the database that can be reverted to as long as the logs are available. The logs are typically archived or deleted after a database checkpoint so that the disk space consumed can be freed. This feature enables optimistic data synchronization by providing points in the past at which the synchronization of the memory store and the DW/ES is known and to which the state of the EPS can be returned in case of failure.

In the example of FIGS. 12–15, event serialization and logging enables event acceptance and recovery. By tagging each event with a serial number as it comes into the EPS, logging the event at the front end (e.g., a DCI) and persistently storing the last serial number processed in each database transaction (in the memory store and DW/ES), in nearly all cases it is possible to recover to the last successfully processed event, and to replay accepted events from that point forward. Without such a mechanism, exceptional events such as the failure of a RAE will generally always require a more expensive recovery (in terms of lost cycles that could be spent processing new events) to a recovery point. Furthermore, if event serial numbers are associated with the incoming stream and event sequence number on that stream, it is possible to provide an event supplier with sufficient information to be able to replay an event stream without losing events (e.g., if the EPS could not recover) or duplicating events.

Recovery requirements dictate that a return to a previously established recovery point should be avoided where possible, and that a process that has failed and restarted should avoid recovery modes wherever possible (e.g., RAE was idle, with no uncommitted or queued work when it failed, and so there is therefore nothing to recover), because these are considered "expensive" propositions in terms of lost cycles that could otherwise be devoted to processing new events.

Figure 12:
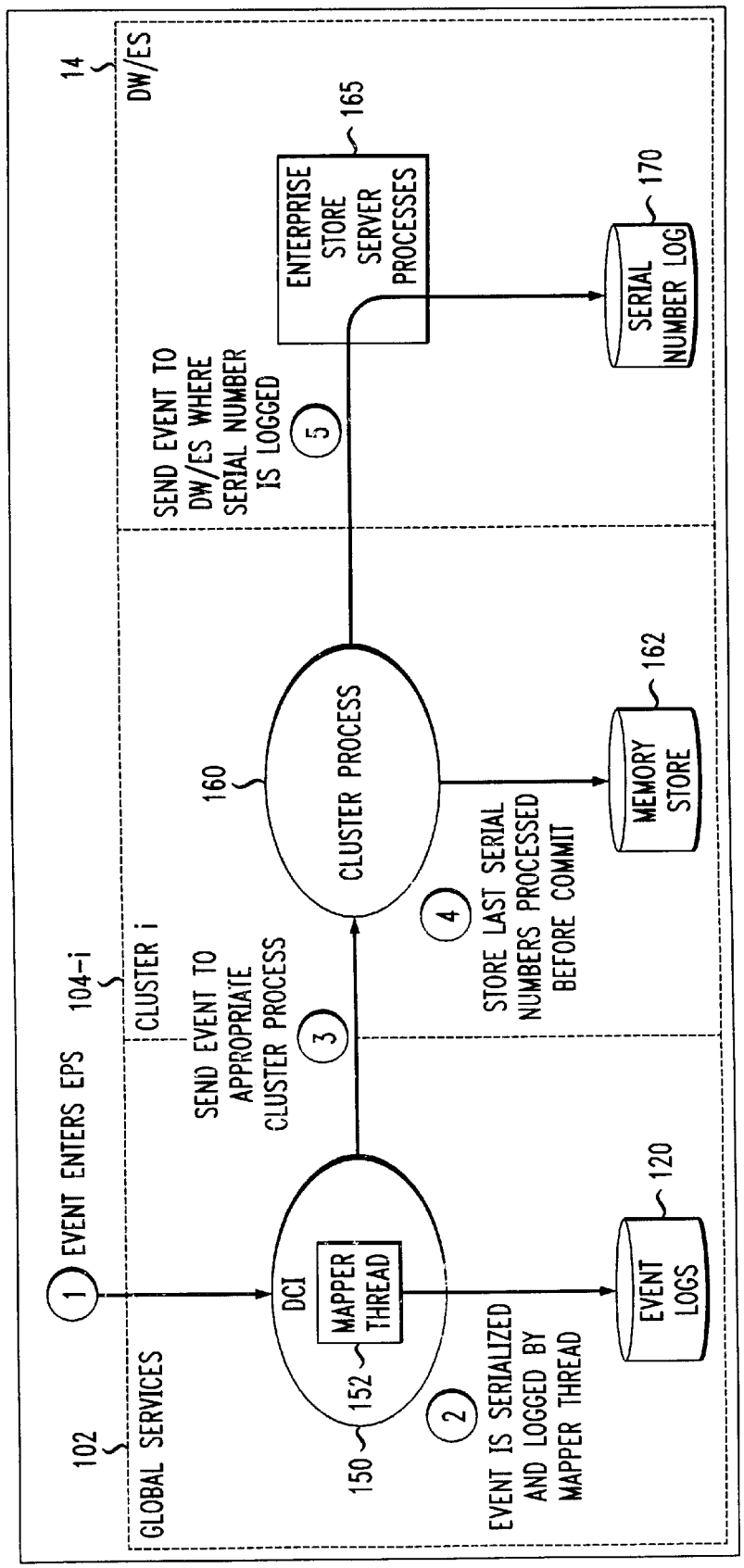
FIGS. 12 through 15 illustrate exemplary event processing, recovery point establishment, cluster recovery and cluster process recovery procedures, respectively, which may be implemented in a real-time event processing system.

FIG. 12 illustrates the event processing procedure for a given event arriving in the EPS 12. It is assumed that the EPS 12 and DW/ES 14 are up and available for handling events. The steps in the event processing procedure are as follows:

1. The given event enters the EPS 12.

2. The event is received by a DCI 150 implemented in the global services portion 102 of EPS 12. The DCI 150 includes a mapper thread 152 which is responsible for event serialization and logging. The incoming event is serialized, e.g., assigned one of a series of monotonically increasing serial numbers, by DCI 150 as soon as the event is accepted into the EPS. The serial number remains associated with the event as the event passes through the EPS, and uniquely identifies that event within global services 102, the cluster 104-i, and the DW/ES 14. Serialized events are then logged by the DCI 150 in event log 120 so that the events can be recovered and replayed to the cluster 104-i in case the cluster (or a process in the cluster) fails, or in case the DCI 150 itself fails.

3. The serialized and logged event is sent to the appropriate cluster process 160.

4. Before each transaction commit, the cluster process 160 records in memory store 162 the serial number of the last event processed and that of the last event sent to the DW/ES 14. The memory store 162 corresponds generally to the memory store 32 of FIG. 2, and a designated portion of the memory store 162 may be associated with each of the RAEs in the cluster 104-i.

5. The DW/ES 14 utilizes one or more enterprise store server processes 165 to record in a serial number log 170 the last serial number received for each cluster process.

Figure 13:
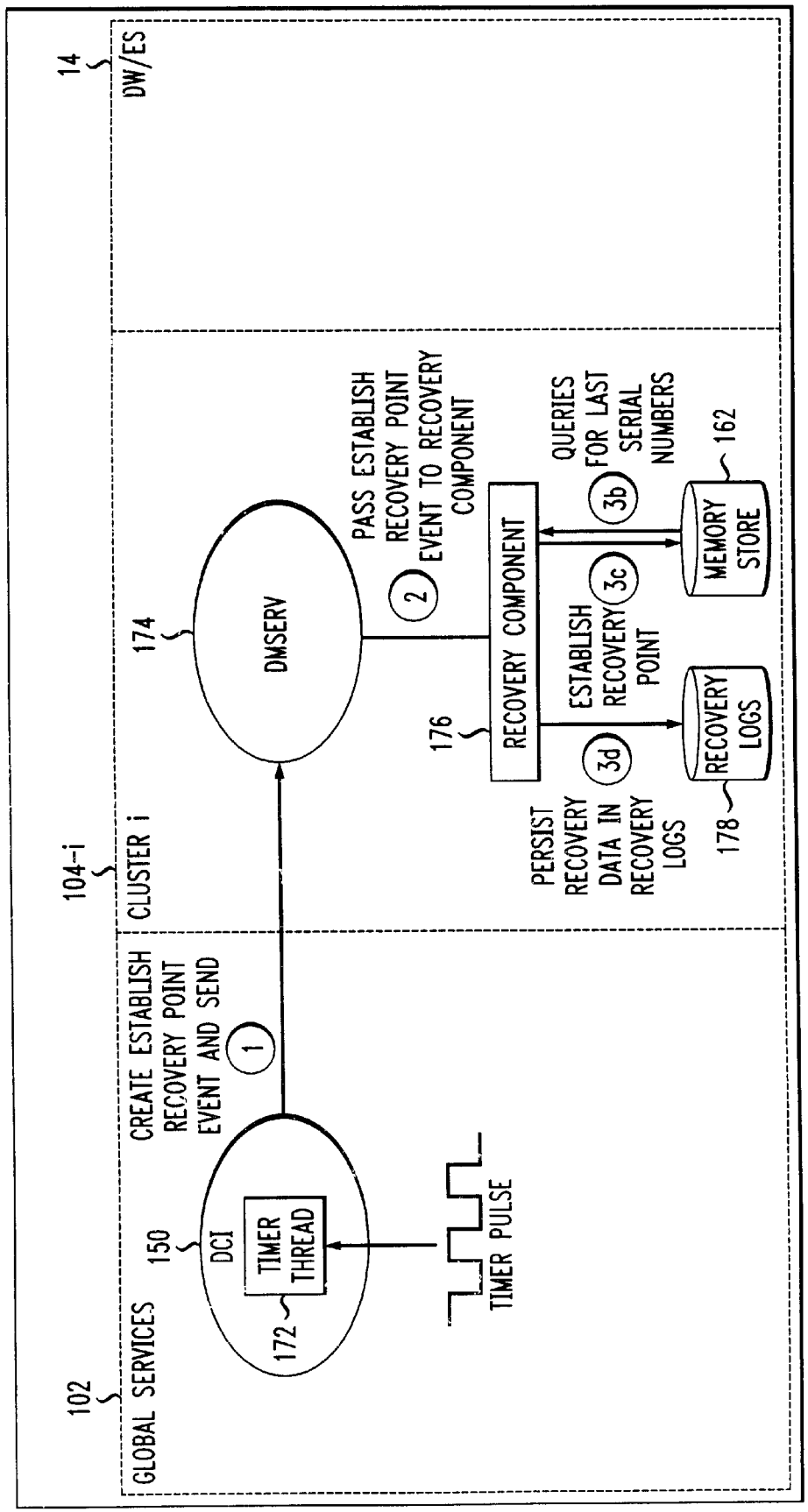

FIG. 13 illustrates a recovery point establishment procedure which includes the following steps:

1. In accordance with a period determined by a tunable parameter, a timer thread 172 in DCI 150 generates an establish recovery point event and transmits it to a dmserv process 174 in the cluster 104-i.

2. The dmserv process 174 passes the event to a recovery component 176. The recovery component 176 encapsulates functions for handling establish recovery point events and for invoking the memory store 162 to rollback to a previous recover point.

3. The recovery component 176 performs the following operations:
   a. Commits the current open dmserv transaction and opens a new one.
   b. Reads from the memory store 162 the last serial numbers processed by the cluster 104-i as well as last sent to the DW/ES.
   c. Establishes a recovery point in the memory store 162. A handle to the recovery point is obtained, and the handle identifies the location, e.g., in the above-noted redo logs, where the recovery point was placed, and the date and time at which the recovery point was taken.
   d. Writes the recovery point handle and last serial numbers processed data to the recovery logs 178. Information associated with established recovery points is persisted in the recovery logs 178, enabling the selection of an appropriate recovery point when an out-of-synchronization condition is detected. The recovery logs 178 in this embodiment are outside the memory store 162 (e.g., in flat files) so that they are available even if the memory store 162 itself is not. The recovery logs 178 may comprise a set of recovery logs 40 as shown in the FIG. 2 embodiment, with each of the logs 40 in the set associated with a corresponding RAE in the cluster 104-i. As another example, the recovery logs 178 may comprise a set of recovery logs including recovery logs 66-1, 66-2 and 74-n as shown in the FIG. 3 embodiment.

4. When the memory store server processes are first started, and right before they are cleanly shut down, a memory store front-end process msfront 180 calls the recovery component 176 to establish a recovery point so that there is always an appropriate memory store state to return to when the cluster is started. The msfront process 180 is associated with the cluster 104-i, and coordinates starting, stopping, and recovering the cluster.

Figure 14:
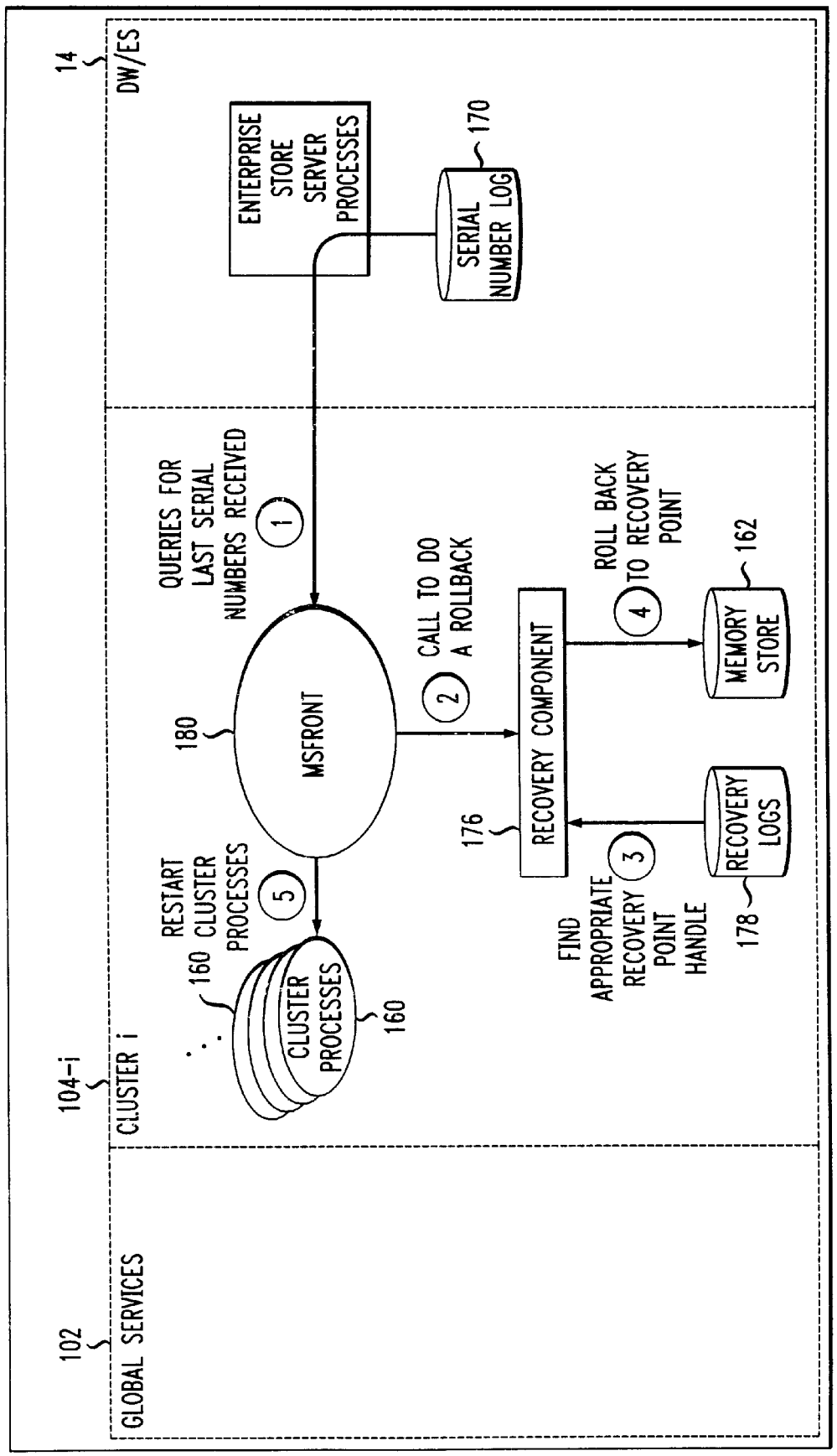

FIG. 14 shows a cluster recovery procedure. It is assumed that the memory store 162 and one or more cluster processes 160 have failed, such that the cluster 104-i requires restarting. The cluster recovery procedure includes the following steps:

1. The msfront process 180 queries the DW/ES 14 for the last serial number received from each cluster process.

2. The msfront process 180 calls the recovery component 176 to do a recovery/rollback to a recovery point, passing it the serial numbers collected in the previous step.

3. The recovery component 176 searches the recovery logs 178 for a recovery point handle for which each associated serial number is less than or equal to the corresponding last serial number received by the DW/ES for that cluster process.

4. The recovery component 176 calls the memory store 162 in order to roll back to the recovery point identified by the recovery point handle obtained from the recovery logs 178.

5. When the rollback is completed, the msfront process 180 restarts all the cluster processes 160.

Figure 15:
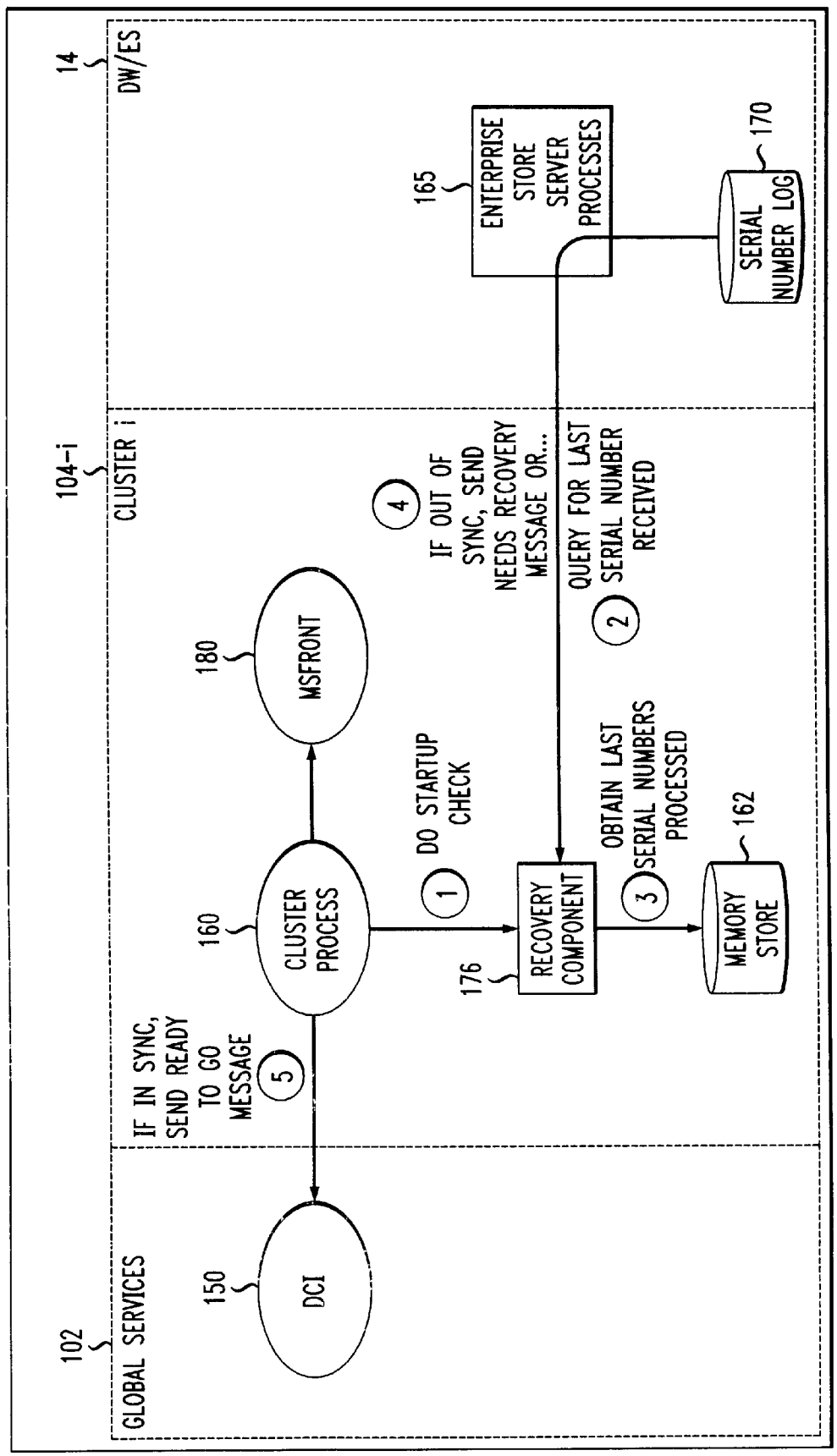

FIG. 15 shows a cluster process recovery procedure. It is assumed that a cluster process has failed and been restarted. The goal is to determine if any events were lost, and if so, to request a recovery.

1. The cluster process 160 invokes the recovery component 176 to do a startup check.

2. The recovery component 176 queries the DW/ES 14 to obtain the last serial number that the DW/ES received from that cluster process.

3. The recovery component 176 queries the memory store 162 to obtain the last serial number it processed and the last serial number that was sent to the DW/ES 14.

4. If the last serial number sent to the DW/ES is greater than the last serial number processed by the DW/ES for that process, the recovery component 176 sends a needs recovery message to the msfront process 180. In this case, the msfront process 180 shuts down the cluster and memory store server processes, and commences the previously-described cluster recovery procedure.

5. If the last serial number sent to the DW/ES is less than or equal to the last serial number processed by the DW/ES for that process, a ready to go message containing the last serial number processed by that cluster process is sent to the DCI 150. The DCI 150 begins sending events starting immediately after that serial number, retrieving events from its event log 120 as necessary.

A number of other examples of recovery point establishment and recovery procedures will be described below. The following is another example of a set of recovery point establishment and recovery procedures also suitable for use in the FIG. 11 embodiment:

1. Recovery point frequency is configured per cluster by an administrator.

2. For each recovery point, the following recovery point establishment operations occur:

a. Recovery management element 114 sends a notification to DCIsender, a process implemented by the data collection and mapping element 110, to establish a recovery point for cluster i. It provides a unique identifier for this recovery point.

b. DCIsender places a recoveryPoint message on the processing stream for that cluster behind all currently queued inputs and stops sending additional inputs down that stream.

c. Cluster i RAE 134-i receives the recoveryPoint message and marks the WS 142-i with the unique identifier passed on from recovery management element 114. Once the recovery point is established, RAE 134-i notifies recovery management element 114 of the recoveryPoint identifier and last transaction number processed. The recovery management element 114 persistently stores this recovery point and last transaction number information for cluster i.

d. Recovery management element 114 notifies cluster i daily maintenance element 130-i to establish a recovery point using the same unique identifier for the flat file store. The daily maintenance element 130-i notifies recovery management element 114 when complete (this could happen in parallel with step c).

e. Recovery management element 114 notifies DCIsender to start processing for cluster i. DCIsender starts processing in the appropriate order (service plans, maintenance inputs, then transactions and events/triggers), ensuring that these are uniquely sequentially tagged. When daily maintenance element 130-i is handling service plan inputs it should have sufficient information to be able to back out flat file store changes for these inputs in case of recovery to an earlier recovery point.

f. DCIsender sends service plan inputs followed by maintenance inputs to daily maintenance element 130-i. Daily maintenance element 130-i notifies DCIsender when complete.

g. DCIsender sends transactions and events/triggers to RAE 134-i until the next recovery point notification.

3. The recovery process includes the following operations:

a. Recovery management element 114 detects cluster i failure, halts DCIsender for that cluster's inputs and restarts the cluster's process group.

b. Recovery management element 114 queries the DW/ES 14 for the last committed transaction identifier for cluster i.

c. Recovery management element 114 determines the appropriate recovery point for cluster i, e.g., the recovery point's last committed transaction←last committed transaction for cluster i, and signals cluster i's DataBlitz™ server to restore to the appropriate recovery point. Cluster i's DataBlitz™ server notifies recovery management element 114 when complete.

d. Recovery management element 114 notifies daily maintenance element 130-i to recover the flat file store to the given recovery point. Daily maintenance element 130-i notifies recovery management element 114 when complete (this can be in parallel with step c).

e. Recovery management element 114 notifies DCIsender to start cluster i's inputs after that recovery point's last committed transaction identifier.

f. The DW/ES 14 filters records it had already committed between the recovery point and the need for recovery. A possible alternative is to filter this inside the EPS at both RAE 134-i and daily maintenance element 130-i.

An example of a time stamp recovery process, which may be implemented in the embodiment of FIG. 11, will now be described. It is assumed for purposes of the example that there are three sites involved in event processing for a given application. In parallel, a front-end site passes a data stream to two back-end sites. For example, in the EPS 12 of FIG. 11, the front-end site may be an element of the global services 102, e.g., the data collection and mapping element 110, and the back-end sites may be clusters 104-i. Each of the two back-end sites does some processing on the data stream and updates their local data store or database. One of the back-end sites is assumed to be running the DataBlitz™ storage manager, and it further assumed that the other back-end site, which is not running DataBlitz™ storage manager, is always behind on processing the data stream. The SenderMgr is a process running on the front-end site, which passes a data stream to the back-end sites. The RecvMgr is a process running on each back-end site, which receives the data streams from the front-end site. The RecoveryMgr is a process that coordinates the recovery activity for all of the participating sites.

In the event of a crash or other system failure, the application uses time stamp recovery at the DataBlitz™ storage manager site in order to recover back in time to a transactionally consistent point that is equivalent to the other back-end site's transactionally consistent state. The following are a set of recovery point establishment and recovery operations:

1. The frequency of the recovery points is determined in this example by an administrator. The administrator sets the DataBlitz™ storage manager site's system configuration parameter MAX_RECOVER_POINTS accordingly. Within the application, a recovery point consists of a unique identifier, last processed message identifier, and a BlzRecoverPoint.

2. For each recovery point, the following recovery point establishment operations occur:

a. RecoveryMgr sends a notification to the SenderMgr running on the front-end site to establish a recover point.

b. SenderMgr places the recover point message on the data streams for its two back-end sites behind all currently-queued inputs.

c. Once the RcvrMgr on the DataBlitz™ storage manager site receives the recover point message, it calls a process BlzSys::setRecoverPoint. Once the recover point is established, the RcvrMgr notifies the RecoveryMgr passing back the established BlzRecoverPoint. The RecoveryMgr persistently stores the BlzRecoverPoint with the recover point information at the non-DataBlitz™ storage manager site.

d. In parallel, the same input stream is being processed by the other non-DataBlitz™ storage manager site. The RcvrMgr at this site commits its updates upon receipt of the recovery point message. It too notifies the RecoveryMgr that it has committed updates up to the specified recover point (commits on this site must go after commits on the DataBlitz™ storage manager site).

3. The recovery process includes the following operations:

a. RecoveryMgr detects a failure at one of the sites.

b. RecoveryMgr halts the SenderMgr if necessary, and then restarts the failed site.

c. RecoveryMgr queries the RecvMgr at the non-DataBlitz™ storage manager site to obtain the last committed recover point.

d. RecoveryMgr instructs the RcvrMgr at the DataBlitz™ storage manager site to stop its database server. The RcvrMgr calls BlzSys::stop, and then calls BlzSys::recover specifying the recover point to use. Once the DataBlitz™ storage manager has recovered, the RcvrMgr notifies the RecoveryMgr about recovery completion.

e. RecoveryMgr notifies the SenderMgr to start passing the data streams again, starting from the recover point's last processed message.

The above-described embodiments of the invention are intended to be illustrative only. Numerous alternative embodiments may be devised by those skilled in the art without departing from the scope of the following claims.

What is claimed is:

1. An apparatus for processing events generated by at least one system application, the apparatus comprising:

a processor for executing code to implement at least a portion of at least one real-time analysis engine, wherein the real-time analysis engine processes the events in accordance with at least one service implemented therein, wherein the service is generated by compiling code generated in a service authoring environment associated with the real-time analysis engine;

wherein the service authoring environment includes a declarative language for use in generating the services, wherein the language includes a set of procedural programming constructs and a set of declarative data-management constructs; and wherein the declarative language includes one or more of the following data structures: (i) a base table which supports insert, update, delete and select operators, (ii) a chronicle which supports insert and select operators, wherein an insert into a chronicle corresponds to generation of a record on an output stream, and (iii) a view which supports a select operator and whose contents are derived from one or more other tables.

2. The apparatus of claim 1 wherein the real-time analysis engine receives the events in the form of one or more input streams from at least one data source, and delivers information representative of processed events in one or more output streams to at least one data sink.

3. The apparatus of claim 2 wherein at least one of the data source and the data sink comprises at least one of a network element of the system, a client associated with the application, and a database element.

4. The apparatus of claim 1 further including a plurality of processors for executing code to implement the at least one real-time analysis engine.

5. The apparatus of claim 1 wherein the processor executes code to implement at least a portion of a main-memory database system.

6. The apparatus of claim 5 wherein the real-time analysis engine processes the events utilizing data stored in a memory portion of the main-memory database system accessible to the real-time analysis engine.

7. The apparatus of claim 1 wherein both base tables and views are stored explicitly in a memory portion of a main-memory database system accessible to the real-time analysis engine, but chronicles are not stored in the memory portion of the main-memory database system.

8. The apparatus of claim 1 wherein at least one of the services generated in the service authoring environment and implemented in the real-time analysis engine is an application-specific service associated with the system application.

9. An apparatus for processing events generated by at least one system application, the apparatus comprising:

a processor for executing code to implement at least a portion of at least one real-time analysis engine, wherein the real-time analysis engine processes the events in accordance with at least one service implemented therein, wherein the service is generated by compiling code generated in a service authoring environment associated with the real-time analysis engine;

wherein the service authoring environment includes at least one graphical user interface for generating at least one of the services, a static check element for processing a service generated by the graphical user interface, and a translation and compilation element for generating program code for implementing the service within the real-time analysis engine.

10. An apparatus for processing events generated by at least one system application, the apparatus comprising:

a processor for executing code to implement at least a portion of at least one real-time analysis engine, wherein the real-time analysis engine processes the events in accordance with at least one service implemented therein, wherein the service is generated by compiling code generated in a service authoring environment associated with the real-time analysis engine; wherein the service authoring environment generates at least one of the services in the form of object code which is dynamically linked into the real-time analysis engine without interrupting event processing.

11. An apparatus for processing events generated by at least one system application, the apparatus comprising:
a processor for executing code to implement at least a portion of at least one real-time analysis engine, wherein the real-time analysis engine processes the events in accordance with at least one service implemented therein, wherein the service is generated by compiling code generated in a service authoring environment associated with the real-time analysis engine;
wherein at least one service generated by the service authoring environment includes:
  a set of event handlers for implementing an application-specific service;
  configuration, summary and aggregation data used to support event processing;
  a set of queries that can be invoked within the system application; and
  a set of input and output streams which interface the real-time analysis engine to a data source and data sink, respectively.

12. An apparatus for processing events generated by at least one system application, the apparatus comprising:
a processor for executing code to implement at least a portion of at least one real-time analysis engine, wherein the real-time analysis engine processes the events in accordance with at least one service implemented therein, wherein the service is generated by compiling code generated in a service authoring environment associated with the real-time analysis engine;
wherein the service authoring environment includes a translation and compilation element that converts code in a service authoring language into a component comprising at least one dynamically linked library which is linked into a running process associated with the real-time analysis engine to implement at least a portion of an application-specific service implemented in the real-time analysis engine.

13. A method of processing events generated by at least one system application, the method comprising the steps of:
generating code in a service authoring environment associated with at least one real-time analysis engine to provide a service which is implemented in the real-time analysis engine; and
processing the events in the real-time analysis engine in accordance with the service;
wherein the service authoring environment includes a declarative language for use in generating the services, wherein the language includes a set of procedural programming constructs and a set of declarative data-management constructs; and
wherein the declarative language includes one or more of the following data structures: (i) a base table which supports insert, update, delete and select operators, (ii) a chronicle which supports insert and select operators, wherein an insert into a chronicle corresponds to generation of a record on an output stream, and (iii) a view which supports a select operator and whose contents are derived from one or more other tables.

14. The method of claim 13 further including the steps of
receiving the events in the real-time analysis engine in the form of one or more input streams from at least one data source; and
delivering information representative of processed events in one or more output streams to at least one data sink.

15. The method of claim 13 wherein the processing step further includes processing the events utilizing data stored in a memory portion of a main-memory database system accessible to the real-time analysis engine.

16. The method of claim 13 wherein both base tables and views are stored explicitly in a memory portion of a main-memory database system accessible to the real-time analysis engine, but chronicles are not stored in the memory portion of the main-memory database system.

17. The method of claim 13 wherein at least one of the services generated in the service authoring environment and implemented in the real-time analysis engine is an application-specific service associated with the system application.

18. A method of processing events generated by at least one system application, the method comprising the steps of:
generating code in a service authoring environment associated with at least one real-time analysis engine to provide a service which is implemented in the real-time analysis engine; and
processing the events in the real-time analysis engine in accordance with the service;
wherein the service authoring environment includes at least one graphical user interface for generating at least one of the services, a static check element for processing a service generated by the graphical user interface, and a translation and compilation element for generating program code for implementing the service within the real-time analysis engine.

19. A method of processing events generated by at least one system application, the method comprising the steps of:
generating code in a service authoring environment associated with at least one real-time analysis engine to provide a service which is implemented in the real-time analysis engine; and
processing the events in the real-time analysis engine in accordance with the service;
wherein the generating step includes generating at least one of the services in the form of object code which is dynamically linked into the real-time analysis engine without interrupting event processing.

20. A method of processing events generated by at least one system application, the method comprising the steps of:
generating code in a service authoring environment associated with at least one real-time analysis engine to provide a service which is implemented in the real-time analysis engine; and
processing the events in the real-time analysis engine in accordance with the service;
wherein the service authoring environment includes a translation and compilation element that converts code in a service authoring language into a component comprising at least one dynamically linked library which is linked into a running process associated with the real-time analysis engine to implement at least a portion of an application-specific service implemented in the real-time analysis engine.

21. An article of manufacture comprising a machine-readable medium for storing one or more programs for processing events generated by at least one system application, wherein the programs when executed by a processor implement the steps of (i) generating code in a service authoring environment associated with at least one real-time analysis engine to provide a service which is implemented in the real-time analysis engine, and (ii) processing the events in the real-time analysis engine in accordance with the service;

wherein the service authoring environment includes a declarative language for use in generating the services, wherein the language includes a set of procedural programming constructs and a set of declarative data-management constructs; and wherein the declarative language includes one or more of the following data structures: (i) a base table which supports insert, update, delete and select operators, (ii) a chronicle which supports insert and select operators, wherein an insert into a chronicle corresponds to generation of a record on an output stream, and (iii) a view which supports a select operator and whose contents are derived from one or more other tables.

* * * * *